United States Patent
Kuppannan et al.

(10) Patent No.: US 11,363,068 B2
(45) Date of Patent: Jun. 14, 2022

(54) METHOD AND SYSTEM FOR PROVIDING A COMPLETE TRACEABILITY OF CHANGES INCURRED IN A SECURITY POLICY

(71) Applicant: COLORTOKENS, INC., Santa Clara, CA (US)

(72) Inventors: Jayaraghavendran Kuppannan, Bangalore (IN); Deepak Kushwaha, Bangalore (IN)

(73) Assignee: COLORTOKENS, INC., Santa Clara, CA (US)

( * ) Notice: Subject to any disclaimer, the term of this patent is extended or adjusted under 35 U.S.C. 154(b) by 406 days.

(21) Appl. No.: 16/673,539

(22) Filed: Nov. 4, 2019

(65) Prior Publication Data
US 2021/0136117 A1    May 6, 2021

(51) Int. Cl.
*H04L 29/06* (2006.01)
*H04L 9/40* (2022.01)

(52) U.S. Cl.
CPC ........ *H04L 63/20* (2013.01); *H04L 2463/121* (2013.01)

(58) Field of Classification Search
CPC ............. H04L 63/0421; H04L 63/1483; G06F 21/6254; G06F 21/62; G06F 21/6227; G06F 21/6245

USPC ............................................. 726/1
See application file for complete search history.

(56) References Cited

U.S. PATENT DOCUMENTS

| | | | | |
|---|---|---|---|---|
| 2007/0116285 | A1* | 5/2007 | Nakai | H04L 63/0428 380/255 |
| 2019/0098054 | A1* | 3/2019 | Ramachandran | H04L 63/20 |

* cited by examiner

*Primary Examiner* — Longbit Chai
(74) *Attorney, Agent, or Firm* — Barry Choobin; Patent 360LLC

(57) ABSTRACT

A computer-implemented method and a system provide a complete traceability of changes incurred in a security policy corresponding to a resource. A policy tracing engine (PTE) monitors and determines events of interest occurring at the resource. The PTE determines administrator-initiated intent-based changes and dynamic event-based changes incurred in the security policy and assigns a unique policy identifier (UPI) to the security policy. The UPI is a combination of unique identifiers assigned to the intent-based change and the event-based change. The PTE recomputes and stores the security policy and the UP in a policy database. The PTE receives network access information including the UPI from the corresponding resource deployed with the security policy. The PTE generates a traceability report that provides a complete traceability of each policy action performed in a networked environment to a source of each change incurred in the security policy as identified by the UPI.

18 Claims, 7 Drawing Sheets

METHOD AND SYSTEM FOR PROVIDING A COMPLETE TRACEABILITY OF CHANGES INCURRED IN A SECURITY POLICY

BACKGROUND

Technical Field

The embodiments disclosed herein, in general, relate to management of security policies. More particularly, the embodiments disclosed herein relate to providing a complete traceability of changes incurred in a security policy.

DESCRIPTION OF THE RELATED ART

In deploying a firewall at an enterprise, an administrator may change a security policy implemented on the firewall, for example, by configuring a new security policy, modifying a previously deployed security policy, removing a previously deployed security policy, etc. Moreover, dynamic events at resources in an enterprise may also induce changes in security policies deployed at the corresponding resources. Most enterprises are moving towards microsegmented networks. Microsegmentation is used to segment and control access between resources and servers in a granular way. In a microsegmented network, changes to a security policy may be initiated by an administrator as disclosed above or by dynamic events, for example, a change in an internet protocol (IP) address of a server, a change of access provided to an end user, a change in a role of a server, etc. Any change to the security policies that results in policy actions such as allowing or denying traffic to the resources of an enterprise has a significant business impact on the enterprise. Dynamic events are significant for recomputing a microsegmentation security policy for an affected resource. These dynamic events incur changes in the security policies without any interference from an administrator. Tracking changes incurred in security policies of multiple resources and determining what caused the changes to happen to result in traffic being allowed or denied at each of the resources, are difficult as there is no link created between the security policies configured by the administrators, the security policies deployed at the resources, intent-based changes to the security policies configured by the administrators, and dynamic event-based changes induced in the security policies.

Hence, there is a long-felt need for a computer-implemented method and a system for addressing the above-recited problems associated with the related art by providing a complete traceability of changes incurred in a security policy corresponding to a resource.

SUMMARY

This summary is provided to introduce a selection of concepts in a simplified form that are further disclosed in the detailed description. This summary is not intended to determine the scope of the claimed subject matter.

The computer-implemented method and the system disclosed herein address the above-recited need for providing a complete security policy traceability of changes incurred in a security policy corresponding to a resource. The computer-implemented method disclosed herein employs a policy tracing engine and at least one processor configured to execute computer program instructions defined by the policy tracing engine for providing a complete security policy traceability of changes incurred in a security policy corresponding to a resource. The policy tracing engine monitors events occurring at a corresponding resource. The policy tracing engine determines events of interest from the monitored events. The events of interest comprise events that trigger recomputation of the security policy configured for the corresponding resource and deployed at the corresponding resource. The policy tracing engine determines the changes incurred in the security policy by the events of interest. The changes comprise intent-based changes initiated by an administrator and event-based changes dynamically induced at the corresponding resource.

On determining the changes incurred in the security policy, the policy tracing engine assigns a unique policy identifier to the security policy. The unique policy identifier is configured as a combination of a unique intent identifier assigned to each of the intent-based changes and a unique event identifier assigned to each of the event-based changes. In an embodiment, the policy tracing engine stores a mapping of the unique intent identifier and information of each of the intent-based changes in a policy database. The information of each of the intent-based changes comprises a timestamp of an occurrence of each of the intent-based changes. In another embodiment, the policy tracing engine stores a mapping of the unique event identifier and information of each of the event-based changes in an event database and/or the policy database. The information of each of the event-based changes comprises a timestamp of an occurrence of an event and each of the event-based changes. The unique policy identifier creates a tracing link between the changes and the security policy. The policy tracing engine recomputes the security policy based on the changes and stores the security policy and the assigned unique policy identifier in the policy database. In an embodiment, the policy tracing engine dynamically updates the policy database with each of the intent-based changes and the assigned unique intent identifier, each of the event-based changes and the assigned unique event identifier, the security policy configured by the administrator, and the security policy deployed at the corresponding resource. The policy tracing engine transmits the security policy and the assigned unique policy identifier to the corresponding resource for deployment at the corresponding resource.

The policy tracing engine receives network access information comprising the unique policy identifier from the corresponding resource deployed with the transmitted security policy. The policy tracing engine generates a traceability report that provides a complete traceability of each of multiple policy actions performed in a networked environment to a source of each of the changes incurred in the security policy as identified by the unique policy identifier by analyzing and correlating the network access information in communication with the policy database. During the analysis and the correlation of the network access information, the policy tracing engine fetches detailed information of an intent-based change corresponding to the unique intent identifier configured in the unique policy identifier, from the policy database; fetches detailed information of an event-based change corresponding to the unique event identifier configured in the unique policy identifier, from the policy database; and maps policy attributes of the security policy stored in the policy database to network access attributes contained in the network access information using the detailed information of the intent-based change and the detailed information of the event-based change for tracing each of the policy actions performed in the networked environment to the source of the intent-based change and/or the event-based change. In an embodiment, the policy tracing engine generates the traceability report for selected time intervals to provide a time-based trace of each of the policy actions performed in the networked environment to the source of each of the changes incurred in the security policy as identified by the unique policy identifier.

In one or more embodiments, related systems comprise circuitry and/or programming for effecting the methods disclosed herein. The circuitry and/or programming can be any combination of hardware, software, and/or firmware configured to effect the methods disclosed herein depending upon the design choices of a system designer. Also, in an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the computer-implemented method and the system disclosed herein, exemplary constructions of the computer-implemented method and the system disclosed herein are shown in the drawings. However, the computer-implemented method and the system disclosed herein are not limited to the specific methods and components disclosed herein. The description of a method step or a component referenced by a numeral in a drawing is applicable to the description of that method step or component shown by that same numeral in any subsequent drawing herein.

DETAILED DESCRIPTION

Various aspects of the present disclosure may be embodied as a system, a method, or a non-transitory, computer-readable storage medium having one or more computer-readable program codes stored thereon. Accordingly, various embodiments of the present disclosure may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit".

Figure 1:
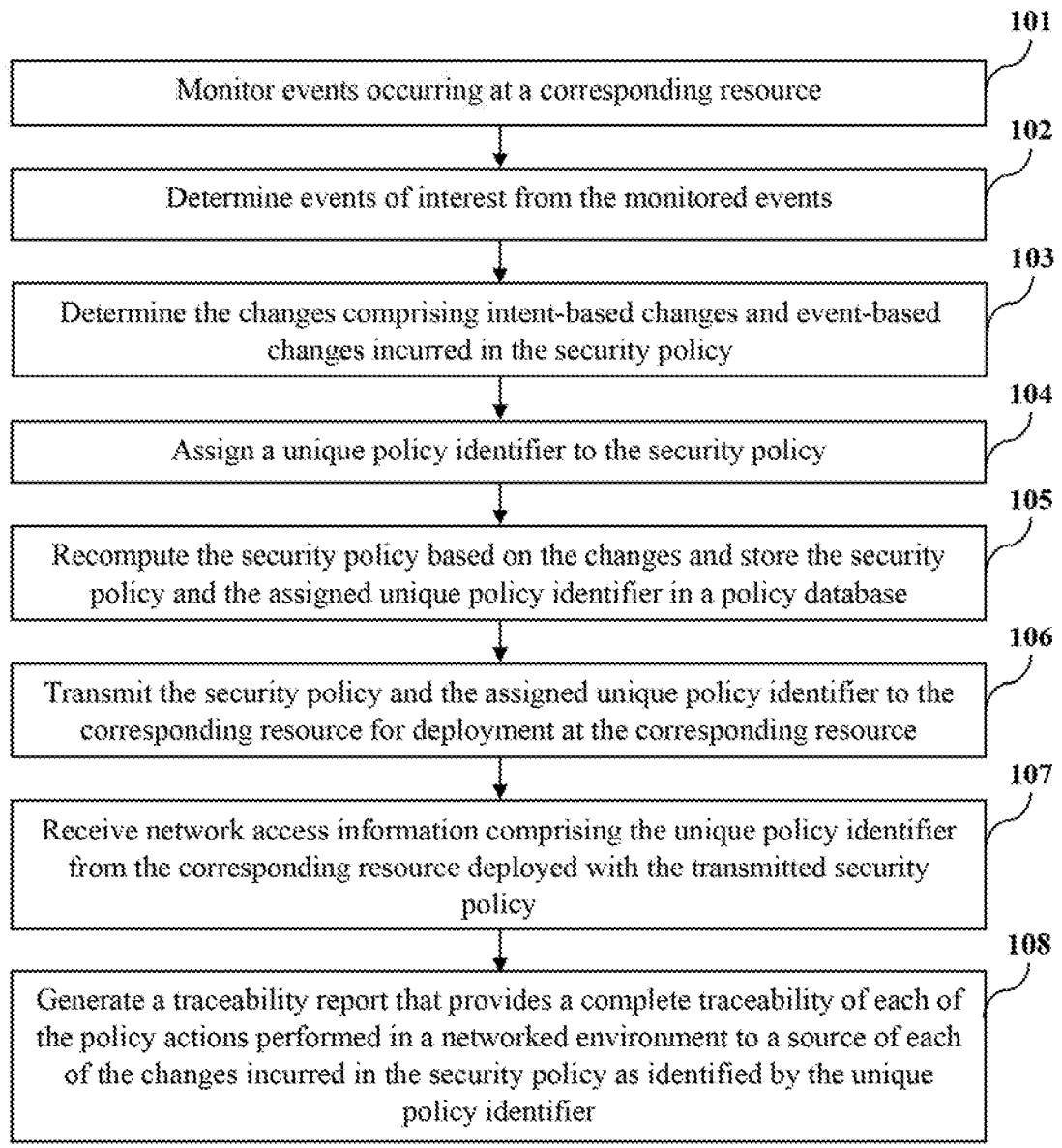
FIG. 1 illustrates a computer-implemented method for providing a complete traceability of changes incurred in a security policy corresponding to a resource, in accordance with an embodiment herein.

FIG. 1 illustrates a computer-implemented method for providing a complete traceability of changes incurred in a security policy corresponding to a resource, in accordance with an embodiment herein. The complete traceability provides an explanation on why network access or traffic is allowed or denied in a networked environment, for example, a private network of an organization such as an enterprise. The security policy is, for example, a host-based firewall policy implemented at each of multiple resources, for example, endpoint devices, in an organization. The computer-implemented method disclosed herein employs a policy tracing engine and at least one processor configured to execute computer program instructions defined by the policy tracing engine for providing a complete traceability of changes incurred in a security policy corresponding to a resource. Multiple events in a networked environment trigger changes to a security policy. These events are categorized, for example, as administrator-initiated events and dynamic events occurring at the resources in the networked environment. The administrator-initiated events refer to events initiated by a human user, for example, an administrator, who interacts with the policy tracing engine via a graphical user interface, for managing and effecting changes to security policies in an organization. The administrator-initiated events comprise, for example, configuration of a new security policy, modification of a previously deployed security policy, removal of a previously deployed security policy, etc. The dynamic events are caused by changes in attributes of a resource due to multiple network factors. In an embodiment, the dynamic events are triggered by machines without direct interaction with the policy tracing engine. The dynamic events are asynchronous events comprising, for example, events related to a host machine such as a change in an internet protocol (IP) address of the host machine, events related to a user's login to a resource such as an endpoint device, a change in a tag of a host machine, a change in vulnerability of a host machine, a change in host virtual machine assigned matching tags, a change of access provided to an end user, a change in a role of a server, etc. The changes to the security policy triggered by the events induce policy actions, for example, allowing traffic, denying traffic, etc., at a resource.

The policy tracing engine monitors 101 events occurring at a corresponding resource. In an embodiment, the policy tracing engine utilizes a logical bus for transporting occurrences of the events from sources, for example, administrator devices, resources such as endpoint devices, etc., to the policy tracing engine. The logical bus is distributed over physical compute nodes, for example, standalone computer systems. In an embodiment, a software agent, for example, a policy agent, is deployed at each of the resources that need to be protected using a security policy. The software agent captures any event that occurs at the resource, for example, a change in the IP address of the resource, an addition of a new interface to the resource, an installation of a new patch on the resource, a new login to the resource, etc., and transmits the captured events to an administrator device such as a server that manages the security policy. On receiving these captured events, the policy tracing engine accessible by the administrator device determines whether any of the events is of interest and needs to be processed. The policy tracing engine determines 102 events of interest from the monitored events. The events of interest comprise events that trigger recomputation of the security policy configured for the corresponding resource and deployed at the corresponding resource. An event is of interest when the event results in a change to a security policy deployed on any managed resource. For example, a change in configuration parameters or policy attributes configured by an administrator is an event of interest. In another example, a change in an IP address of a particular host machine is of interest if that particular host machine has a managed security policy, as opposed to another host machine that does not have a managed security policy. Other examples of events of interest comprise a change in resource attributes such as addition of a new operating system (OS) software patch; a change in tags or labels assigned to a resource such as a change of a tag, database (DB), to a tag, application (APP); a change in a location of a resource, for example, when an employee or a server is moved from one office location to another office location; employee login into a resource as different employee logins trigger different types of permissions for access; etc.

The policy tracing engine determines 103 changes incurred in the security policy by the events of interest. The changes comprise intent-based changes initiated by an administrator and event-based changes dynamically induced at the corresponding resource. As used herein, "intent-based change" refers to a configurational change made by an administrator to a security policy based on a particular intent of the administrator in accordance with requirements of an organization. The intent-based changes incurred in a security policy are induced by the administrator-initiated events. When an administrator configures a new security policy, modifies a previously deployed security policy, or removes a previously deployed security policy, the changes incurred in the security policy result in the intent-based changes to the security policy. For example, when an administrator adds a resource to a group, the resource has a security policy that allows traffic to and from resources in the group. Similarly, when an administrator removes a resource from a group, the resource has a security policy that denies traffic into or out of the resource. In another example, an end user with a particular user identification is provided access to a particular set of servers in the morning shift and another end user is provided access to a different set of servers in the evening shift. The changes incurred in the security policy, for example, by addition or removal of a resource from a group, or by a change in user identification for a morning shift or an evening shift, result in intent-based changes to the security policy. Also, as used herein, "event-based changes" refer to changes dynamically induced in a security policy by dynamic events caused by changes in attributes of a resource. For example, a change in the IP address of a host machine results in an event-based change in the security policy, and accordingly triggers a recomputation of the security policy to include the changed IP address.

On determining the changes incurred in the security policy, the policy tracing engine assigns 104 a unique policy identifier to the security policy. The policy tracing engine configures the unique policy identifier as a combination of a unique intent identifier assigned to each of the intent-based changes and a unique event identifier assigned to each of the event-based changes. That is, the policy tracing engine assigns a unique intent identifier to each of the intent-based changes and a unique event identifier to each of the event-based changes, and thereafter configures the unique policy identifier as a combination of the unique intent identifier and the unique event identifier. The policy tracing engine configures the unique intent identifier and the unique event identifier, for example, as numbers, strings, alphanumeric characters, hash values, etc. Accordingly, the policy tracing engine configures the unique policy identifier as a combination of numbers, strings, alphanumeric characters, hash values, etc., that represents the unique intent identifier and the unique event identifier together. In an embodiment, the policy tracing engine separates the unique intent identifier and the unique event identifier by a separation element, for example, a period symbol, an underscore symbol, a hyphen symbol, a comma, etc. For example, the policy tracing engine represents the unique policy identifier as "intentd.e-ventId". In another example, the unique policy identifier is a single 64-bit number consisting of 32 bits of the unique intent identifier and 32 bits of the unique event identifier.

Consider an example where an administrator configures a security policy to allow a transmission control protocol (TCP)-22 from a resource such as Machine-A having an IP address "IP-A" to another resource such as Machine-B having an IP address "IP-B". The policy tracing engine configures and assigns a unique policy identifier, for example, as "1,0", to the security policy, where "1" is the unique intent identifier assigned to the administrator-initiated intent-based change and "0" is the unique event identifier assigned to a dynamic event-based change, which results in appropriate security policies in both Machine-A and Machine-B that can be traced back to 1,0. In this example, due to a dynamic host configuration protocol (DHCP), if the IP address of Machine-A changes from "IP-A" to "IP-AA", the security policy of Machine-B changes. The policy tracing engine updates and assigns the unique policy identifier, for example, as "1,1", to the security policy, where "1" is the unique intent identifier assigned to the administrator-initiated intent-based change and "1" is the unique event identifier assigned to the dynamic event-based change of the IP address. The policy tracing engine provides a trace that the event-based change identified by the unique event identifier "1" was initiated upon the intent-based change identified by the unique intent identifier "1". As any intent-based change becomes a base on which an event-based change is placed, the policy tracing engine resets the unique event identifier on every intent-based change. For example, if the administrator reconfigures the security policy, the policy tracing engine configures and assigns the unique policy identifier, for example, as "2,0", to the security policy, where "2" is the unique intent identifier assigned to the administrator-initiated intent-based change and "0" is the unique event identifier assigned to a dynamic event-based change. Similarly, the policy tracing engine updates and assigns the unique policy identifier, for example, as "2,1", "2,2", etc., to future event-based changes incurred due to dynamic events until a new security policy is configured by the administrator.

Figure 2:
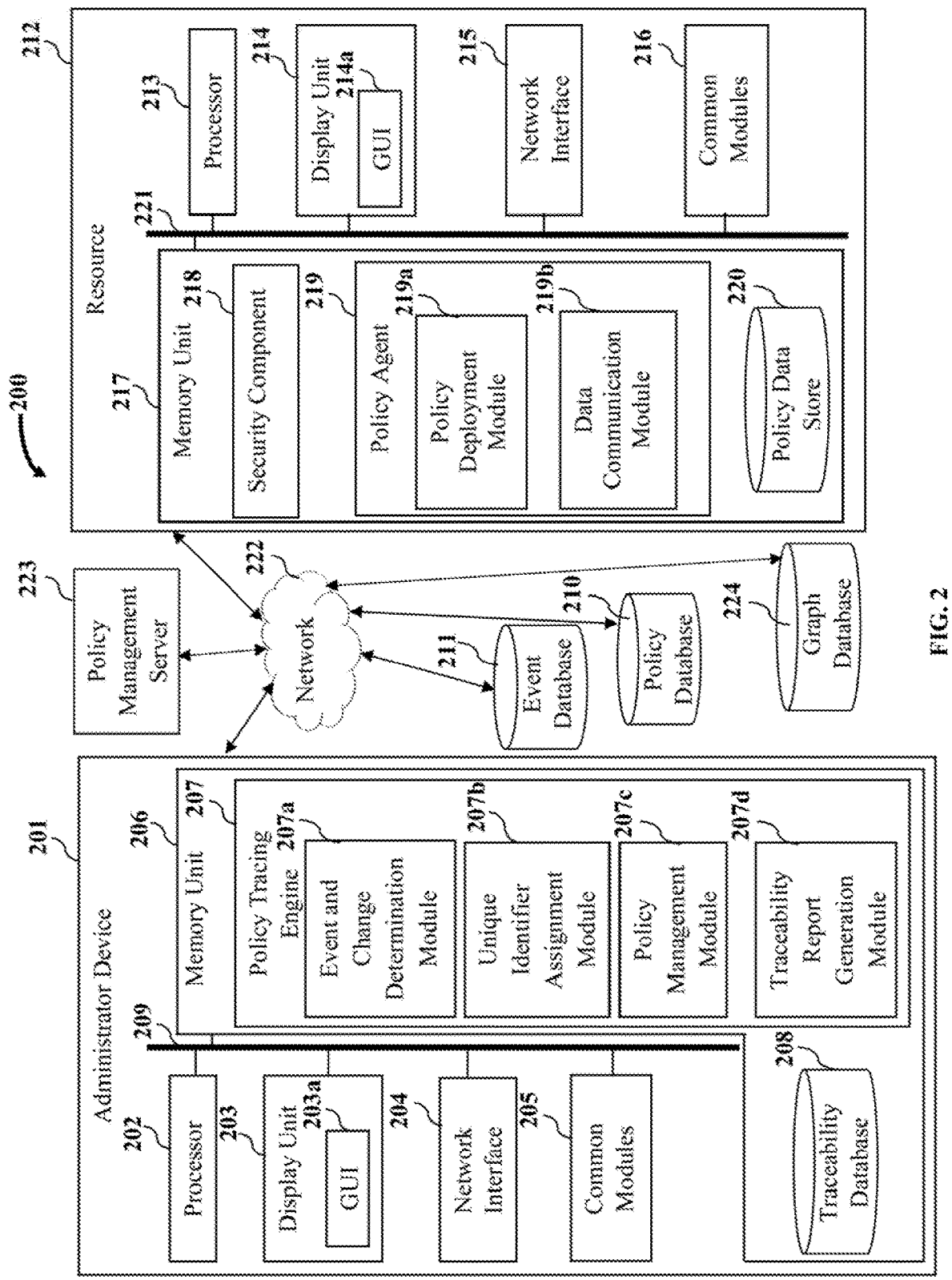
FIG. 2 exemplarily illustrates a system for providing a complete traceability of changes incurred in a security policy corresponding to a resource, in accordance with an embodiment herein.
Figure 3:
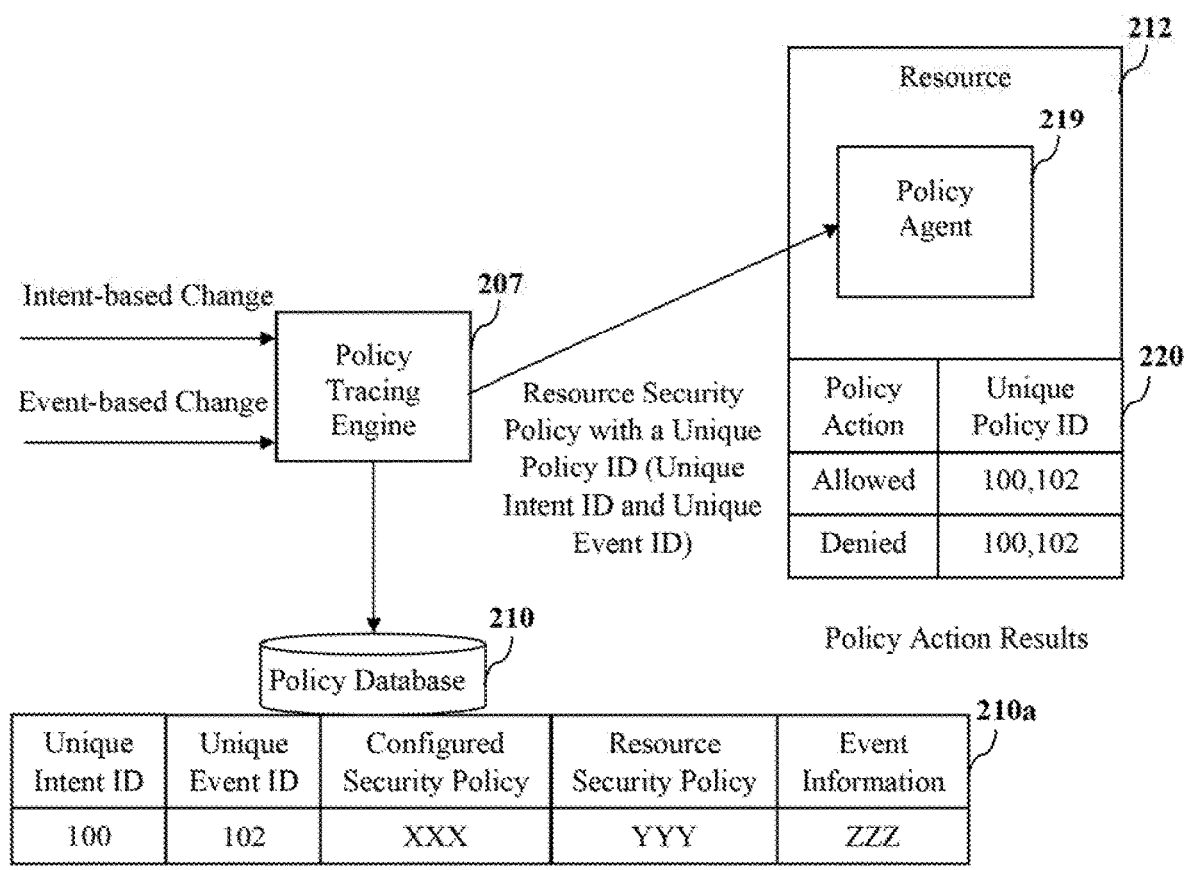
FIG. 3 exemplarily illustrates a schematic diagram showing maintenance of a policy database by a policy tracing engine for providing a complete traceability of changes incurred in a security policy corresponding to a resource, in accordance with an embodiment herein.
Figure 4A:
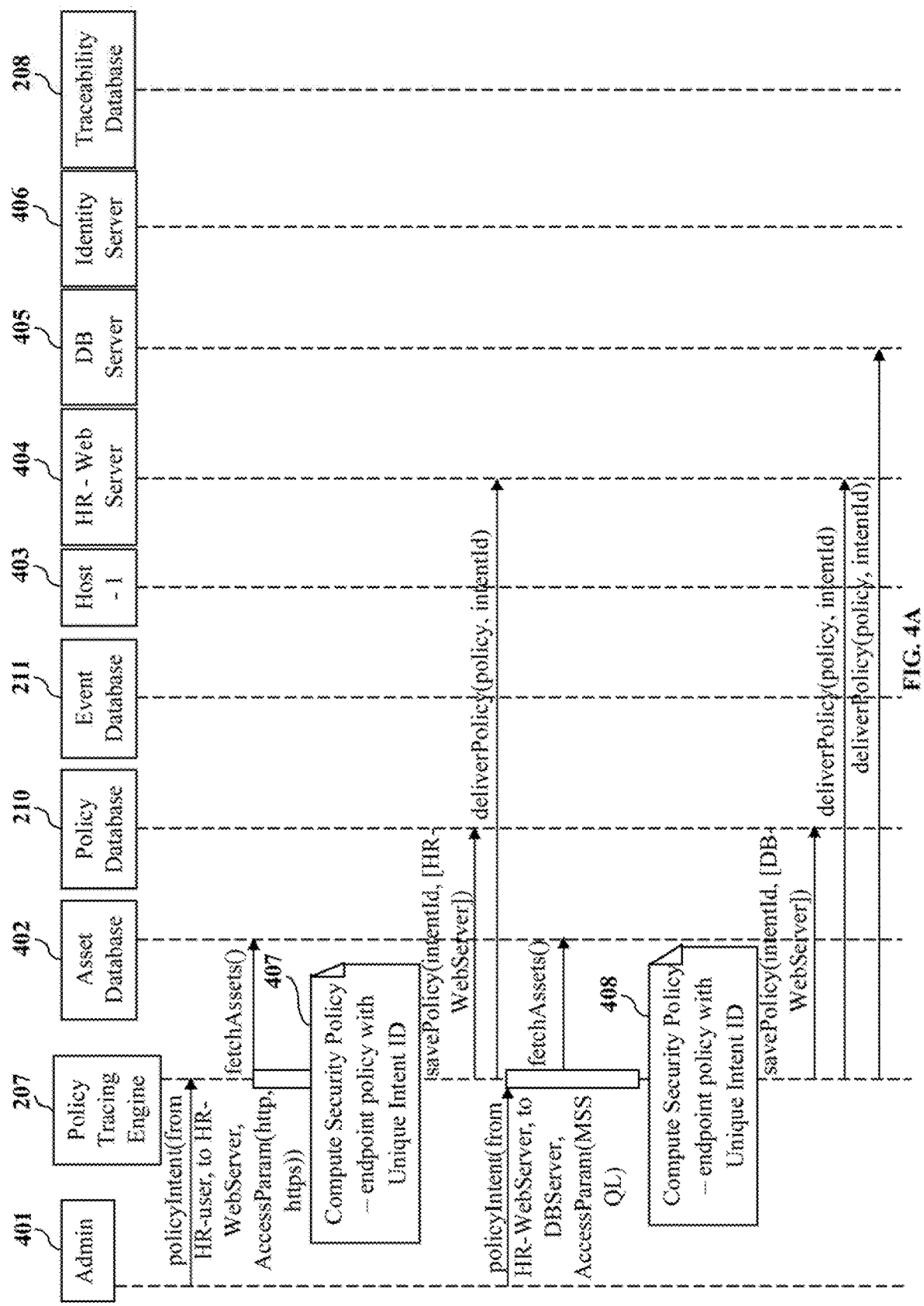
FIGS. 4A-4D exemplarily illustrate a sequence diagram showing interactions between the policy tracing engine, multiple databases, and resources of an organization for providing a complete traceability of changes incurred in a security policy corresponding to a resource, in accordance with an embodiment herein.
Figure 4B:
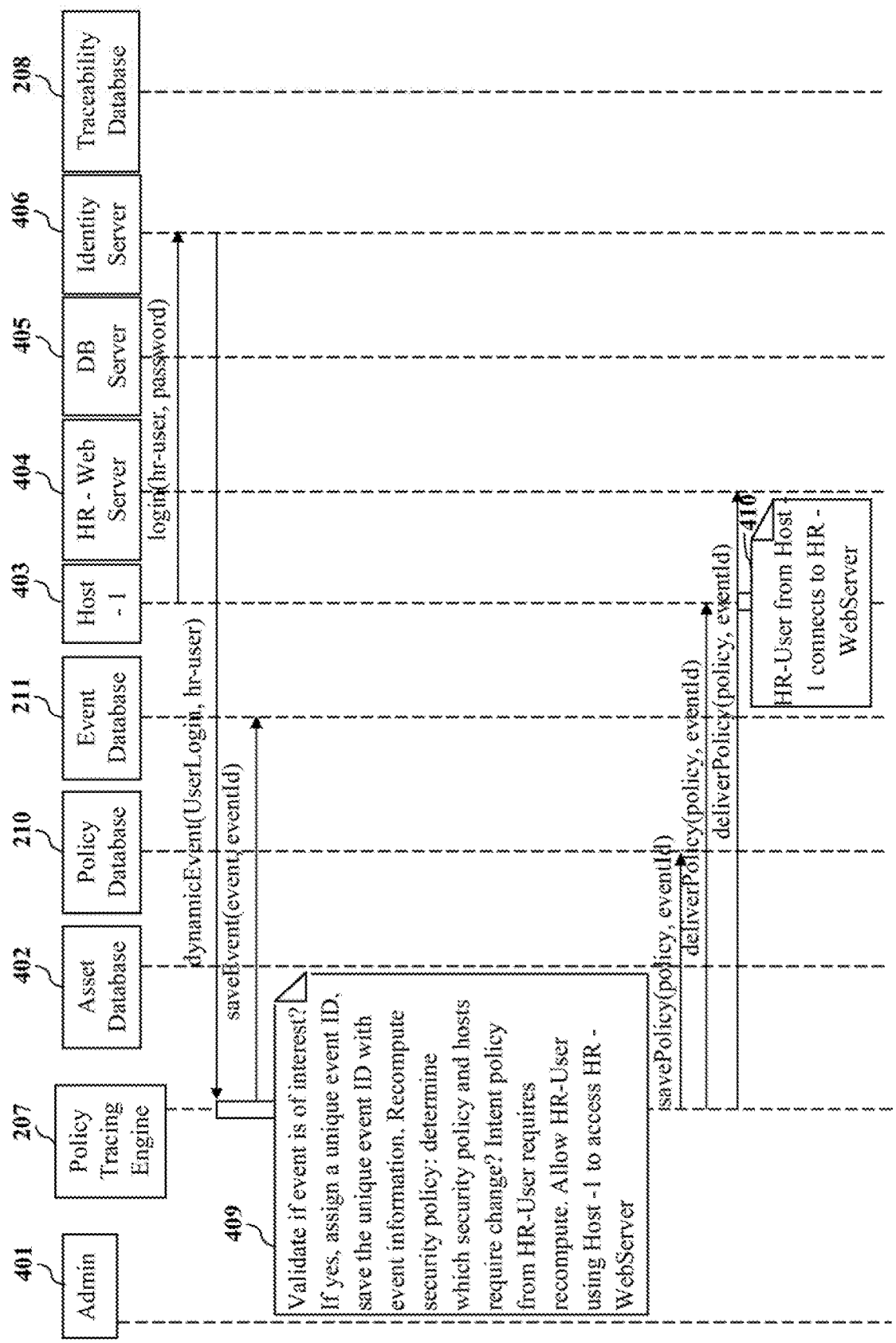
Figure 4C:
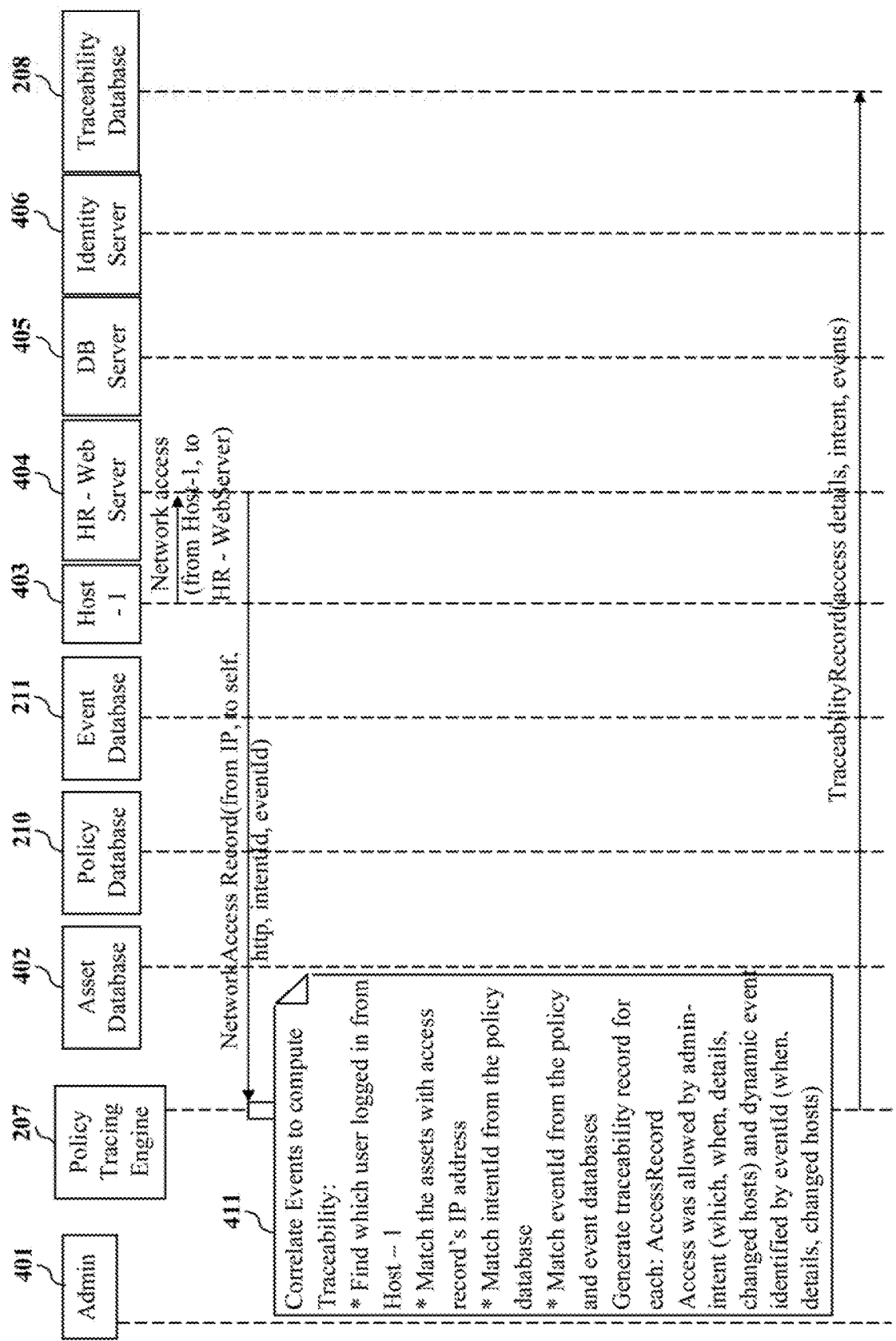
Figure 4D:
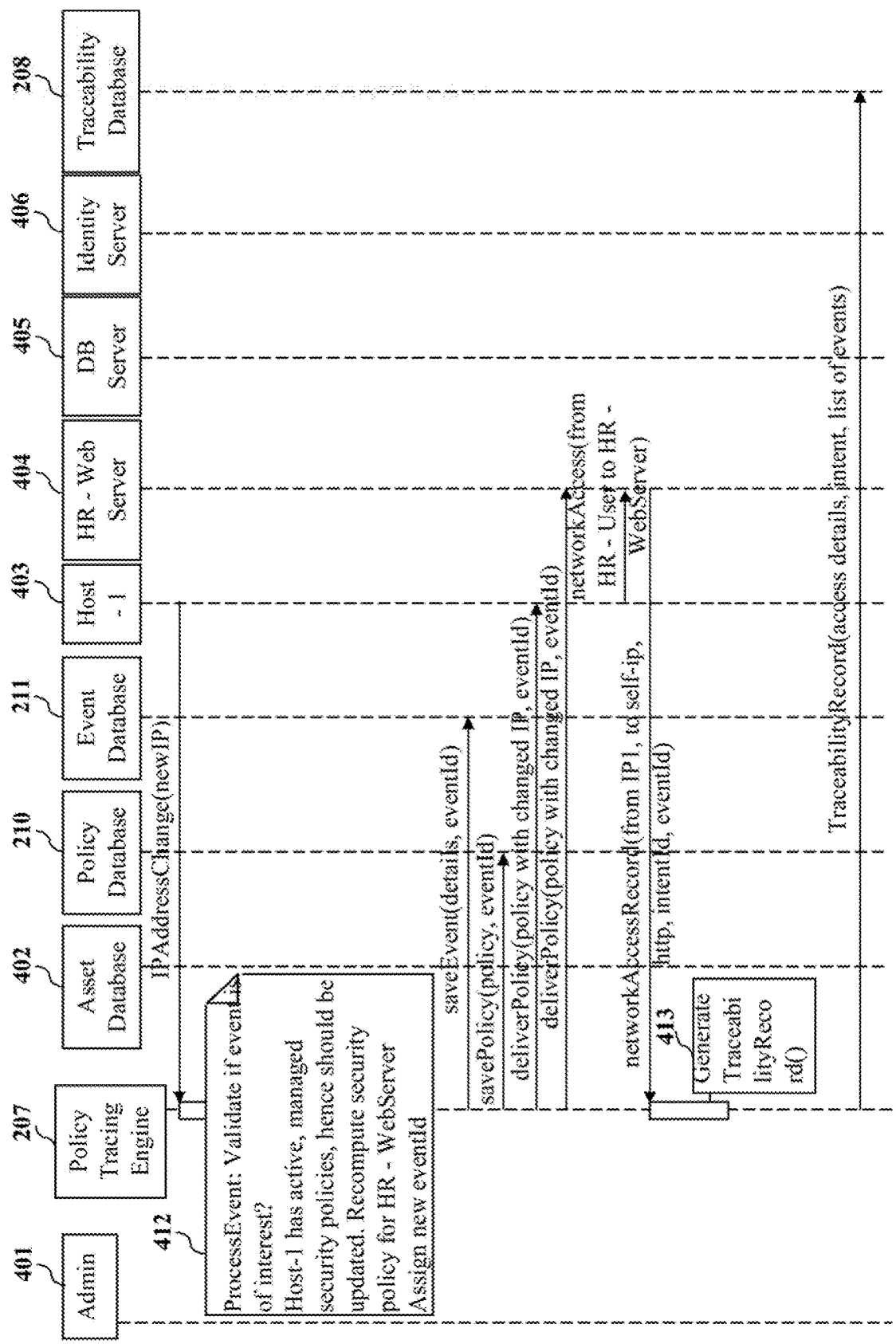

In an embodiment, the policy tracing engine stores a mapping of the unique intent identifier and information of each of the intent-based changes in a policy database as exemplarily illustrated in FIGS. 2-3. The information of each of the intent-based changes comprises a timestamp of an occurrence of each of the intent-based changes. In an embodiment, the policy tracing engine stores a mapping of the unique event identifier and information of each of the event-based changes in an event database and/or the policy database. In an embodiment, the policy database and the event database are configured as separate database tables. In another embodiment, the policy database and the event database are configured as a single database table. The information of each of the event-based changes comprises a timestamp of an occurrence of an event and each of the event-based changes. The unique policy identifier creates a tracing link between the changes and the security policy. As used herein, "tracing link" refers to a link created between the security policy configured by an administrator, the security policy deployed at a corresponding resource, the intent-based changes made to the security policy, and the event-based changes induced in the security policy. The tracking link created by the unique policy identifier provides a complete trace of the changes incurred in the security policy.

On determining an intent-based change and/or an event-based change, the policy tracing engine automatically recomputes 105 the security policy based on the changes and stores 105 the security policy and the assigned unique policy identifier in the policy database. In an embodiment, an administrator configures or edits a security policy from a graphical user interface (GUI) rendered on an administrator device, resulting in administrator-initiated intent-based changes to the security policy. The administrator device transmits information on the configuration and edits made to the security policy by the administrator to a policy management server using an application programming interface (API). The policy management server recomputes the security policy based on the transmitted information. In an embodiment, the policy tracing engine deployed at the administrator device recomputes the security policy based on the configuration and edits made by the administrator via the GUI. In another embodiment, the policy tracing engine is deployed at the policy management server for recomputing the security policy based on the transmitted information. The administrator device and/or the policy management server transmit the recomputed security policy to the policy agent deployed at each of the resources.

In an embodiment, the policy agent deployed at each of the resources captures and transmits the event-based changes, for example, a change in the IP address of the corresponding resource, an addition of a new interface to the corresponding resource, an installation of a new patch on the corresponding resource, a new login to the corresponding resource, etc., to the policy management server that manages the security policy. On receiving the event-based changes, the policy management server determines whether any of these event-based changes needs to be processed. On determining that these event-based changes need to be processed, the policy management server recomputes the security policy appropriately based on the event-based changes and transmits the recomputed security policy to the policy agents to be applied on the respective resources. In an embodiment, the policy tracing engine deployed at the administrator device recomputes the security policy on receiving the event-based changes from the policy agent deployed at each of the resources. In another embodiment, the policy tracing engine is deployed at the policy management server for recomputing the security policy based on the event-based changes. The administrator device and/or the policy management server transmit the recomputed security policy to the policy agent deployed at each of the corresponding resources.

The policy tracing engine determines which security policy and resources require a change and recomputes, or in an embodiment, facilitates recomputation of the security policy for each resource. In a microsegmentation environment, for example, any change in one resource impacts all the resources to which that one resource is allowed to be connected. In each resource, the policy agent deployed thereon adds a security policy that states to which other resources a particular resource can connect or from which other resources a particular resource can receive connections and on which specific port and protocols. For example, based on an intent-based change where an administrator, using an administrator device, configures a security policy to state all resources belonging to Group A can connect to all resources belonging to Group B, the policy tracing engine on the administrator device or the policy management server configured to manage the security policy, configures and transmits the security policy to all resources belonging to Group A and Group B. If the IP address of a resource R-A1 belonging to Group A changes, then the policy tracing engine or the policy management server recomputes the security policy for the resource R-A1 and all resources of Group B. As the IP address of the resource R-A1 has changed and all resources in Group B have security policies based on the IP address of the resource R-A1, the policy tracing engine or the policy management server also recomputes the security policies of all resources in Group B. In an embodiment, the policy tracing engine determines which security policies of which resources need recomputation by maintaining a graph database that stores details of connections between the resources, that is, the details of which resource is connected to which other resources. The graph database implements graph theory for storing, mapping and querying relationships and connections between the resources. The policy tracing engine also maintains details of connections between the resources based on a port and a protocol in the graph database, thereby allowing determination of the security policy that requires a recomputation.

In an embodiment, on determining an intent-based change or an event-based change, a policy controller implemented in the administrator device automatically recomputes the security policy corresponding to a resource, in communication with the policy tracing engine. In an embodiment, the policy tracing engine dynamically updates the policy database with each of the intent-based changes and the assigned unique intent identifier, each of the event-based changes and the assigned unique event identifier, the security policy configured by the administrator, and the security policy deployed at the corresponding resource. Storing the unique policy identifier and the information of each of the intent-based changes and the event-based changes in the policy database and/or the event database allows the policy tracing engine to provide a complete traceability from the changes to the security policy. The policy tracing engine transmits 106 the recomputed security policy and the assigned unique policy identifier to the corresponding resource for deployment at the corresponding resource.

The policy tracing engine receives 107 network access information comprising the unique policy identifier from the corresponding resource deployed with the transmitted security policy. For example, when a host machine accesses a server in the networked environment, the server transmits a record comprising the network access information to the policy tracing engine. The network access information comprises, for example, event information of the resource with a managed security policy, a traffic protocol used to allow or deny traffic to the resource, an IP address of the resource, a destination port, and the unique policy identifier that contains the combination of the unique intent identifier and the unique event identifier. The policy tracing engine receives the record from the server and proceeds to generate a traceability report. The policy tracing engine generates 108 the traceability report that provides a complete traceability of each of multiple policy actions performed in the networked environment to a source of each of the changes incurred in the security policy as identified by the unique policy identifier by analyzing and correlating the network access information in communication with the policy database. In the computer-implemented method disclosed herein, the determination of the events of interest and the changes incurred in the security policy is transformed into the unique policy identifier that is further transformed into the traceability report that provides a complete traceability of each of multiple policy actions performed in the networked environment to a source of each of the changes incurred in the security policy as identified by the unique policy identifier.

During the analysis and the correlation of the network access information comprising the unique policy identifier, the policy tracing engine, in communication with the policy database, fetches detailed information of an intent-based change corresponding to the unique intent identifier configured in the unique policy identifier, from the policy database; fetches detailed information of an event-based change corresponding to the unique event identifier configured in the unique policy identifier, from the policy database; and maps policy attributes of the security policy stored in the policy database to network access attributes contained in the network access information using the detailed information of the intent-based change and the detailed information of the event-based change for tracing each of the policy actions performed in the networked environment to the source of the intent-based change and/or the event-based change. The policy tracing engine fetches the security policy configured by the administrator and stored in the policy database to obtain the detailed information of the intent-based change. In an embodiment, the policy tracing engine compares a hash of the original security policy previously stored in the policy database and a hash of the modified security policy to obtain detailed information of the intent-based change. In another embodiment, the policy tracing engine compares the previously stored original security policy and the modified security policy to obtain detailed information of the intent-based change. The detailed information of the intent-based change comprises, for example, rules configured by the administrator in the security policy, a timestamp of the configuration of the intent-based change by the administrator, a timestamp of an occurrence of each of the intent-based changes, resource attributes, etc.

Intent-based changes are related to configurations where an administrator configures information such as Group A can talk to Group B over a list of ports and protocol combinations. To determine which resources can be part of Group A and Group B, the administrator uses attributes comprising, for example, resource operating system (OS) values, a system central processing unit (CPU), an environment in which the resources are deployed, locations such as "BLR, SANTACLARA", applications operating on the resources, services such as domain name system (DNS), a network time protocol (NTP), etc., operating on the resources, subnets to which the resources belong, etc. For example, an administrator creates a group, Group A, where the attribute that determines which resources can be part of Group A is a subnet "10.0.225.0/24". The administrator creates another group, Group B, where the attribute that determines which resources can be part of Group B is a service "DNS", that is, all resources that run the DNS server service can be part of Group B. The administrator further configures a security policy by stating, Group A, that is, all resources having an IP address that belongs to the subnet "10.0.225.0/24", can connect on a user datagram protocol (UDP) and Port 53 to Group B, that is, to all resources that run the DNS server service. In this example, the detailed information of the intent-based change comprises details related to the groups such as group name, the attributes which define the group, a time of creation of the group, the resources that belong to the group, the set of ports and protocols on which different groups can talk to each other, etc. In the above example, if the IP address of a particular resource was originally, 10.0.225.10, then the resource qualifies to be part of Group A and obtains a security policy based on the intent-based change to access DNS servers in Group B on port 53 and protocol UDP. Similarly, the DNS servers in Group B have a security policy based on the intent-based change that allows the resource with the IP address 10.0.225.10 to access the DNS servers over port 53 and protocol UDP. If a dynamic event occurs in which the IP address of the particular resource changes to "10.0.230.20", then, in an embodiment, the policy tracing engine recomputes the security policy to disallow access from this resource to any of the DNS servers as this resource no longer qualifies to be part of Group A. Similarly, to all resources of Group B, the policy tracing engine withdraws the security policy allowing access from the IP address 10.0.225.10.

The policy tracing engine fetches the security policy that is modified by a dynamic event and stored in the policy database to obtain the detailed information of the event-based change. In an embodiment, the policy tracing engine compares a hash of the original security policy previously stored in the policy database and a hash of the modified security policy to obtain detailed information of the event-based change. In another embodiment, the policy tracing engine compares the previously stored original security policy and the modified security policy to obtain detailed information of the event-based change. The detailed information of the event-based change comprises, for example, rules changed in the security policy by a dynamic event, resource attributes that were changed by the dynamic event, a description of the dynamic event, a timestamp of the dynamic event, a timestamp of an occurrence of each of the event-based changes, etc. The detailed information of the event-based change further comprises, for example, a type of change in a resource such as an IP address change, a patch version change, a location change, label changes or any such attribute changes, etc.; a timestamp of the event-based change; a record of the group to which the resource belonged before the event-based change and the groups to which the resource belongs after the event-based change; security policy for the resource before the event-based change and after the event-based change; etc. In an embodiment, the policy tracing engine fetches the detailed information of the event-based change corresponding to the unique event identifier configured in the unique policy identifier, from the event database. The policy tracing engine compares the policy attributes, for example, rules of the configured and recomputed security policy, with the network access attributes, for example, rules of the security policy deployed at the resource, information of a user who logged into the resource, IP address of the resource that was allowed or denied access, etc., to obtain a trace of each of the policy actions performed in the networked environment to the source of the intent-based change and/or the event-based change.

The traceability report generated by the policy tracing engine provides detailed information on what caused the changes in the security policy to happen that resulted in policy actions, for example, allowing traffic from and to a resource or denying traffic into and out of the resource; the source of the changes, for example, an administrator-initiated event or a dynamic event; at what point of time and how and why the new set of rules of the recomputed security policy allowed traffic from and to the resource, etc. The traceability report provides a significant benefit to enterprises as they require detailed information on what caused traffic to be allowed, what caused the traffic to be denied, the time when a change to the security policy happened, a source of the change, a reason for the change, etc. The traceability report provides enterprises with a complete traceability to determine what caused traffic to be allowed and what caused the traffic to be denied, thereby allowing enterprises to track compliance tasks and meet compliance requirements, for example, while processing financial data in the enterprises. Moreover, the traceability report is useful, for example, in a security audit performed in an enterprise to trace any type of a security loophole by providing an indication of why a particular security policy came about which led to the security loophole. Furthermore, the traceability report provides a differentiation between an administrator-initiated event and a dynamic event that caused a change in the security policy over a period of time. As the unique policy identifier is a combination of the unique intent identifier and the unique event identifier, the policy tracing engine, via the traceability report, provides a trace on the original security policy that was created and the events that caused the security policy to be changed.

The policy tracing engine splits the unique policy identifier into the unique intent identifier and the unique event identifier to identify each intent-based change and each event-based change incurred in the security policy respectively, and provides a trace of an exact source of the configured security policy and an exact event that recomputed the security policy. Any policy action, allowing or denying any traffic, is directly mapped to the unique policy identifier that provides an explanation on why traffic was allowed or denied. Furthermore, the traceability report provides an identification of the source of each of the changes incurred in the security policy. The policy tracing engine maps every policy action performed by a resource to a source of the change incurred in the security policy. The computer-implemented method disclosed herein, therefore, provides a mechanism to trace the source of a security policy, for example, a microsegmentation security policy to either an intent-based change or an event-based change. The computer-implemented method disclosed herein tracks, traces, and differentiates between the security policy computed due to an administrator-initiated configuration and recomputed due to a dynamic event. The computer-implemented method disclosed herein takes account of deployment dynamics and multiple events that may cause a change to the security policy. By accounting for dynamic events, the computer-implemented method disclosed herein provides a complete traceability of changes incurred in a security policy corresponding to a resource.

In an embodiment, the policy tracing engine generates the traceability report for selected time intervals to provide a time-based trace of each of the policy actions performed in the networked environment to the source of each of the changes incurred in the security policy as identified by the unique policy identifier. In this embodiment, the policy tracing engine renders a graphical user interface (GUI) on an administrator device to allow an administrator to select a security policy or a resource and select a time interval for tracing the changes incurred in the security policy configured for the resource and deployed at the resource. On receiving the selections from the administrator via the GUI, the policy tracing engine, using the timestamps stored in the policy database and/or the event database, generates a traceability report for the selected time interval, and displays a time-based trace of each of the policy actions performed in the networked environment to the source of each of the changes incurred in the security policy as identified by the unique policy identifier on the GUI.

FIG. 2 exemplarily illustrates a system 200 for providing a complete traceability of changes incurred in a security policy corresponding to a resource 212, in accordance with an embodiment herein. In an embodiment, the system 200 disclosed herein is implemented in a cloud computing environment. As used herein, "cloud computing environment" refers to a processing environment comprising configurable computing physical and logical resources, for example, networks, servers, storage media, virtual machines, applications, services, etc., and data distributed over a network 222. The cloud computing environment provides an on-demand network access to a shared pool of the configurable computing physical and logical resources. In another embodiment, the system 200 disclosed herein is a cloud computing-based platform implemented as a service for providing a complete traceability of changes incurred in a security policy corresponding to a resource 212. In another embodiment, the system 200 disclosed herein is implemented as an on-premise platform comprising on-premise software installed and run on computers on the premises of an organization such as an enterprise. In an exemplary implementation as shown in FIG. 2, the system 200 disclosed herein comprises a policy tracing engine 207 deployed at an administrator device 201 and a policy agent 219 deployed at a resource 212, for example, an endpoint device, of an organization. In an embodiment, the policy tracing engine 207 communicates with a policy management server 223 via the network 222 for recomputing security policies based on intent-based changes and event-based changes. In another embodiment (not shown), the policy tracing engine 207 is deployed on the policy management server 223 for recomputing security policies based on intent-based changes and event-based changes. In the system 200 disclosed herein, the policy tracing engine 207 on the administrator device 201 interfaces with the policy agent 219 on the resource 212 and the policy management server 223, and therefore more than one specifically programmed computer system is used for providing a complete traceability of changes incurred in a security policy corresponding to a resource 212.

The administrator device 201, the resource 212, and the policy management server 223 are computer systems that are programmable using high-level computer programming languages. In an embodiment, the administrator device 201, the resource 212, and the policy management server 223 are implemented using programmed and purposeful hardware. The administrator device 201 is an electronic device, for example, one or more of a server, a workstation, a personal computer, a tablet computing device, a mobile computer, a smart phone, a portable computing device, a network-enabled computing device, an interactive network-enabled communication device, any other suitable computing equipment, combinations of multiple pieces of computing equipment, etc., operated by a system administrator. The resource 212 is an electronic device, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a server, a portable electronic device, a network enabled computing device, an interactive network enabled communication device, a gaming device, an image capture device, a web browser, any other suitable computing equipment, combinations of multiple pieces of computing equipment, etc., operated by an end user. In an embodiment, the resource 212 is a part of grouped sets of resources.

In an embodiment, the administrator device 201 is in operable communication with the resource 212 and the policy management server 223 via the network 222, for example, a short-range network or a long-range network. The network 222 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

The system 200 disclosed herein further comprises non-transitory, computer-readable storage media, for example, memory units 206 and 217, for storing computer program instructions defined by the policy tracing engine 207 on the administrator device 201 and the policy agent 219 on the resource 212 respectively. As used herein, "non-transitory computer-readable storage media" refers to all computer-readable media, for example, non-volatile media, volatile media, and transmission media, except for a transitory, propagating signal. Non-volatile media comprise, for example, solid state drives, optical discs or magnetic disks, flash memory cards, a read-only memory (ROM), etc. Volatile media comprise, for example, a register memory, a processor cache, a random-access memory (RAM), etc. Transmission media comprise, for example, coaxial cables, copper wire, fiber optic cables, modems, etc., including wires that constitute a system bus coupled to a processor. The system 200 disclosed herein further comprises processors 202 and 213 operably and communicatively coupled to the corresponding memory units 206 and 217 respectively, for executing the computer program instructions defined by the policy tracing engine 207 on the administrator device 201 and the policy agent 219 on the resource 212 respectively.

The memory units 206 and 217 of the administrator device 201 and the resource 212 respectively, are used for storing program instructions, applications, and data. The memory units 206 and 217 are, for example, random-access memories (RAMs) or other types of dynamic storage devices that store information and instructions for execution by the respective processors 202 and 213. The memory units 206 and 217 also store temporary variables and other intermediate information used during execution of the instructions by the respective processors 202 and 213. The administrator device 201 and the resource 212 further comprise read only memories (ROMs) or other types of static storage devices that store static information and instructions for the respective processors 202 and 213. In an embodiment, the policy tracing engine 207 is stored in the memory unit 206 of the administrator device 201. Similarly, a security component 218, for example, a host-based firewall, and the policy agent 219 are stored in the memory unit 217 of the resource 212. The security component 218 is implemented as a hardware component, or a software component, or a combination of a hardware component and a software component on the resource 212.

The system 200 disclosed herein further comprises storage devices, for example, a policy database 210, an event database 211, a graph database 224, a traceability database 208, and a policy data store 220 or database. The policy database 210 stores the security policies and their assigned unique policy identifiers, a mapping of the unique intent identifier and information of each of the intent-based changes made to the security policies, and in an embodiment, a mapping of the unique event identifier and information of each of the event-based changes incurred in the security policies. The event database 211 stores a mapping of the unique event identifier and information of each of the event-based changes. The graph database 224 stores details of connections between the resources. The traceability database 208 stores the traceability report that provides a complete traceability of each of the policy actions performed in a networked environment to a source of each of the changes incurred in the security policy as identified by the unique policy identifier. The policy data store 220 stores rules of the security policy deployed on the resource 212.

In an embodiment, the policy tracing engine 207 accesses the policy database 210, the event database 211, and the graph database 224 via the network 222. In another embodiment (not shown), the policy database 210, the event database 211, and the graph database 224 are stored in the memory unit 206 of the administrator device 201. Furthermore, the traceability database 208 and the policy data store 220 are stored in the memory unit 206 of the administrator device 201 and the memory unit 217 of the resource 212 respectively. The policy database 210, the event database 211, the graph database 224, the traceability database 208, and the policy data store 220 refer to any storage area or medium that can be used for storing data and files. The policy database 210, the event database 211, the graph database 224, the traceability database 208, and the policy data store 220 can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the policy database 210, the event database 211, the graph database 224, and the traceability database 208 can also be locations on a file system of the administrator device 201, while the policy data store 220 can be a location on a file system of the resource 212. In another embodiment, the traceability database 208 and the policy data store 220 can be remotely accessed by the administrator device 201 and the resource 212 respectively, via the network 222. In another embodiment, the policy database 210, the event database 211, the graph database 224, the traceability database 208, and the policy data store 220 are configured as cloud-based databases implemented in a cloud computing environment, where computing resources are delivered as a service over the network 222.

The processor 202 of the administrator device 201 is configured to execute the computer program instructions defined by the policy tracing engine 207 for providing a complete traceability of changes incurred in a security policy corresponding to the resource 212. The processor 213 of the resource 212 is configured to execute the computer program instructions defined by the policy agent 219 for deploying the security policy on the resource 212 and communicating network access information corresponding to the resource 212 to the policy tracing engine 207. The processors 202 and 213 refer to any one or more microprocessors, central processing unit (CPU) devices, finite state machines, computers, microcontrollers, digital signal processors, logic, logic devices, user circuits, application specific integrated circuits (ASICs), field-programmable gate arrays (FPGAs), chips, etc., or any combination thereof, capable of executing computer programs or a series of commands, instructions, or state transitions. In an embodiment, the processors 202 and 213 are implemented as processor sets comprising, for example, a programmed microprocessor and a math or graphics co-processor. The administrator device 201 and the resource 212 are not limited to employing their respective processors 202 and 213. In an embodiment, the administrator device 201 and the resource 212 employ controllers or microcontrollers. The processor 202 of the administrator device 201 executes the modules, for example, 207a, 207b, 207c, 207d, etc., of the policy tracing engine 207. The processor 213 of the resource 212 executes the modules, for example, 219a, 219b, etc., of the resource 212.

As shown in FIG. 2, the administrator device 201 further comprises a data bus 209, a display unit 203, a network interface 204, and common modules 205. Similarly, as shown in FIG. 2, the resource 212 further comprises a data bus 221, a display unit 214, a network interface 215, and common modules 216. The data bus 209 of the administrator device 201 permits communications between the modules, for example, 202, 203, 204, 205, 206, etc., of the administrator device 201. The data bus 221 of the resource 212 permits communications between the modules, for example, 213, 214, 215, 216, 217, etc., of the resource 212. The display unit 203 of the administrator device 201, via a graphical user interface (GUI) 203a, displays information, display interfaces, user interface elements such as checkboxes, input text fields, etc., for example, for allowing a system administrator to configure a security policy for the resource 212, review the network access information received from the resource 212, etc. The administrator device 201 renders the GUI 203a on the display unit 203 for receiving the system administrator's configuration inputs, displaying the network access information, etc. In an embodiment, the display unit 203 is externally coupled to the administrator device 201. The display unit 214 of the resource 212, via a GUI 214a, displays information, display interfaces, user interface elements such as checkboxes, input text fields, etc., for example, for allowing an end user to view a security policy at the resource 212. The resource 212 renders the GUI 214a on the display unit 214 for displaying information related to the security policy. In an embodiment, the display unit 214 is externally coupled to the resource 212. The GUIs 203a and 214a of the administrator device 201 and the resource 212 respectively, comprise, for example, online web interfaces, web-based downloadable application interfaces, mobile-based downloadable application interfaces, etc. The display units 203 and 214 of the administrator device 201 and the resource 212 respectively, display the GUIs 203a and 214a respectively.

The network interfaces 204 and 215 of the administrator device 201 and the resource 212 respectively, enable connection of the administrator device 201 and the resource 212 respectively, to the network 222. In an embodiment, the network interfaces 204 and 215 are provided as interface cards also referred to as line cards. The network interfaces 204 and 215 are, for example, one or more infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol (TCP)/internet protocol (IP), interfaces based on wireless communications technology such as satellite technology, radio frequency technology, near field communication, etc. The common modules 205 and 216 of the administrator device 201 and the resource 212 respectively comprise, for example, input/output (I/O) controllers, input devices such as alphanumeric keyboards, microphones, touchpads, pointing devices, etc., output devices, fixed media drives such as hard drives, removable media drives for receiving removable media, etc. Computer applications and programs are used for operating the administrator device 201 and the resource 212. The programs are loaded onto fixed media drives and into the memory units 206 and 217 of the administrator device 201 and the resource 212 respectively, via their respective removable media drives. In an embodiment, the computer applications and programs are loaded into the memory units 206 and 217 of the administrator device 201 and the resource 212 respectively, directly via the network 222.

In an embodiment, the policy tracing engine 207 is configured as a central module on which a user, for example, a system administrator, configures security policies that allow access between different grouped sets of resources. The policy tracing engine 207 computes the security policy specific to a resource, for example, 212, stores the security policy in the policy database 210, and pushes the security policy to the resource 212 for application of the security policy at the resource 212. In an embodiment, the policy agent 219 deployed at the resource 212 is configured as a thin client application that runs on the resource 212. The policy agent 219 is configured to establish remote connections in a server-based computing environment. In the system 200 disclosed herein, the policy agent 219 communicates with the policy tracing engine 207 to download rules of the security policy for the resource 212. The policy agent 219 stores the downloaded rules of the security policy in the policy data store 220. The policy agent 219 at the resource 212 converts the rules of the security policy received from the policy tracing engine 207, for example, into operating system (OS) specific commands and/or application programming interface (API) messages and applies the converted rules of the security policy on the resource 212.

In an exemplarily implementation of the system 200 disclosed herein, the policy tracing engine 207 comprises an event and change determination module 207a, a unique identifier assignment module 207b, a policy management module 207c, and a traceability report generation module 207d, and the policy agent 219 comprises a policy deployment module 219a and a data communication module 219b. In an embodiment, the policy tracing engine 207 is implemented as a processor configured to execute computer program instructions defined by the modules, for example, 207a, 207b, 207c, 207d, etc., of the policy tracing engine 207. The policy management module 207c at the administrator device 201 configures a security policy for the resource 212, for example, to allow access from the resource 212 to one or more sets of resources on certain ports and protocols based on configuration parameters and inputs received from a system administrator using the GUI 203a on the administrator device 201. The policy deployment module 219a at the policy agent 219 of the resource 212 receives and deploys the security policy configured for the resource 212 with one or more of the configuration parameters on the security component 218 of the resource 212. In an embodiment, the policy deployment module 219a transforms the security policy into a format, for example, OS specific commands and/or API messages applicable to the resource 212 and configures the security policy on the security component 218 of the resource 212 for the deployment of the security policy on the security component 218 of the resource 212.

The event and change determination module 207a monitors events occurring at the resource 212 and determines events of interest from the monitored events as disclosed in the detailed description of FIG. 1. The event and change determination module 207a also determines the changes comprising intent-based changes and event-based changes incurred in the security policy by the events of interest. On determining the changes incurred in the security policy, the unique identifier assignment module 207b assigns a unique policy identifier to the security policy. The unique identifier assignment module 207b assigns a unique intent identifier to each of the intent-based changes and a unique event identifier to each of the event-based changes. The unique identifier assignment module 207b stores a mapping of the unique intent identifier and information of each of the intent-based changes in the policy database 210 as disclosed in the detailed description of FIG. 1. The unique identifier assignment module 207b stores a mapping of the unique event identifier and information of each of the event-based changes in the event database 211 and/or the policy database 210 as disclosed in the detailed description of FIG. 1. The unique identifier assignment module 207b then configures the unique policy identifier as a combination of the unique intent identifier and the unique event identifier. Using the unique policy identifier, the unique identifier assignment module 207b creates a tracing link between the changes and the security policy. In an embodiment, the policy management module 207c, in communication with the event and change determination module 207a and the unique identifier assignment module 207b, dynamically updates the policy database 210 with each of the intent-based changes and the assigned unique intent identifier, each of the event-based changes and the assigned unique event identifier, the security policy configured by the administrator, and the security policy deployed at the resource 212. In an embodiment, the policy management module 207c recomputes the security policy based on the changes and stores the security policy and the assigned unique policy identifier in the policy database 210. The policy management module 207c transmits the security policy and the assigned unique policy identifier to the resource 212 for deployment at the resource 212.

The data communication module 219b of the policy agent 219 transmits network access information comprising the unique policy identifier from the resource 212 deployed with the transmitted security policy to the policy tracing engine 207 at the administrator device 201. The data communication module 219b transmits network access events along with the unique policy identifier, that is, a combination of the unique intent identifier and the unique event identifier, to the policy tracing engine 207. The traceability report generation module 207d receives the network access information from the policy agent 219 at the resource 212 and generates a traceability report. The traceability report generation module 207d analyzes and correlates the network access information in communication with the policy database 210 to generate the traceability report. For generation of the traceability report, the traceability report generation module 207d fetches detailed information of an intent-based change corresponding to the unique intent identifier configured in the unique policy identifier, from the policy database 210; fetches detailed information of an event-based change corresponding to the unique event identifier configured in the unique policy identifier, from the policy database 210; and maps policy attributes of the security policy stored in the policy database 210 to network access attributes contained in the network access information using the detailed information of the intent-based change and the detailed information of the event-based change for tracing each of the policy actions performed in the networked environment to the source of the intent-based change and/or the event-based change. The traceability report provides a complete traceability of each policy action performed in the networked environment to a source of each of the changes incurred in the security policy as identified by the unique policy identifier. In an embodiment, the traceability report generation module 207d generates the traceability report for selected time intervals to provide a time-based trace of each of the policy actions performed in the networked environment to the source of each of the changes incurred in the security policy as identified by the unique policy identifier.

The event and change determination module 207a, the unique identifier assignment module 207b, the policy management module 207c, and the traceability report generation module 207d of the policy tracing engine 207 are disclosed above as software implemented on the processor 202 of the administrator device 201. Similarly, the policy deployment module 219a and the data communication module 219b of the policy agent 219 are disclosed above as software implemented on the processor 213 of the resource 212. In an embodiment, the modules, for example, 207a, 207b, 207c, 207d, etc., of the policy tracing engine 207, and the modules, for example, 219a, 219b, etc., of the policy agent 219 are implemented completely in hardware. In another embodiment, the modules, for example, 207a, 207b, 207c, 207d, etc., of the policy tracing engine 207, and the modules, for example, 219a, 219b, etc., of the policy agent 219 are implemented by logic circuits to carry out their respective functions disclosed above. In another embodiment, the system 200 disclosed herein is also implemented as a combination of hardware and software including the policy tracing engine 207, the policy agent 219, and multiple processors, for example, 202 and 213, that are used to implement the modules, for example, 207a, 207b, 207c, 207d, etc., of the policy tracing engine 207 at the administrator device 201, and the modules, for example, 219a, 219b, etc., of the policy agent 219 at the resource 212.

The processor 202 of the administrator device 201 retrieves instructions defined by the event and change determination module 207a, the unique identifier assignment module 207b, the policy management module 207c, and the traceability report generation module 207d of the policy tracing engine 207 for performing respective functions disclosed above. The processor 213 of the resource 212 retrieves instructions defined by the policy deployment module 219 and the data communication module 219b of the policy agent 219 at the resource 212 for performing respective functions disclosed above. The processor 202 of the administrator device 201 retrieves instructions for executing the modules, for example, 207a, 207b, 207c, 207d, etc., of the policy tracing engine 207 from the memory unit 206 of the administrator device 201. The processor 213 of the resource 212 retrieves instructions for executing the modules, for example, 219a, 219b, etc., of the policy agent 219 from the memory unit 217 of the resource 212. A program counter determines the location of the instructions in the respective memory units 206 and 217. The program counter stores a number that identifies the current position in the program of the modules, for example, 207a, 207b, 207c, 207d, etc., of the policy tracing engine 207, and the modules, for example, 219a, 219b, etc., of the policy agent 219. The instructions fetched by the processors 202 and 213 of the administrator device 201 and the resource 212 respectively, from the respective memory units 206 and 217, after being processed, are decoded. The instructions are stored in an instruction register in the respective processors 202 and 213. After processing and decoding, the processors 202 and 213 execute their respective instructions, thereby performing one or more processes defined by those instructions.

At the time of execution, the instructions stored in the instruction register are examined to determine the operations to be performed. The processors 202 and 213 then perform the specified operations. The operations comprise arithmetic operations and logic operations. Operating systems perform multiple routines for performing a number of tasks required to assign the input devices, the output devices, and the respective memory units 206 and 217 for execution of the modules, for example, 207a, 207b, 207c, 207d, etc., of the policy tracing engine 207 and the modules, for example, 219, 219b, etc., of the policy agent 219 respectively. The tasks performed by the operating systems comprise, for example, assigning memory to the modules, for example, 207a, 207b, 207c, 207d, etc., of the policy tracing engine 207 and the modules, for example, 219a, 219b, etc., of the policy agent 219 and to data used by the administrator device 201 and the resource 212, moving data between the respective memory units 206 and 217 and disk units, and handling input/output operations. The operating systems perform the tasks on request by the operations and after performing the tasks, the operating systems transfer the execution control back to the respective processors 202 and 213. The processors 202 and 213 continue the execution to obtain one or more outputs.

For purposes of illustration, the detailed description refers to the modules, for example, 207a, 207b, 207c, 207d, etc., of the policy tracing engine 207 and the modules, for example, 219a, 219b, etc., of the policy agent 219 being run locally on individual computer systems; however the scope of the computer-implemented method and the system 200 disclosed herein is not limited to the modules, for example, 207a, 207b, 207c, 207d, etc., of the policy tracing engine 207 and the modules, for example, 219, 219b, etc., of the policy agent 219 being run locally on individual computer systems via the operating systems and the respective processors 202 and 213, but may be extended to run remotely over the network 222 by employing a web browser and a remote server, a mobile phone, or other electronic devices. In an embodiment, one or more portions of the system 200 are distributed across one or more computer systems (not shown) coupled to the network 222.

The non-transitory, computer-readable storage media disclosed herein store computer program instructions executable by the processors 202 and 213 for providing a complete traceability of changes incurred in a security policy corresponding to a resource 212. The computer program instructions implement the processes of various embodiments disclosed above and perform additional steps that may be required and contemplated for providing a complete traceability of changes incurred in a security policy corresponding to a resource 212. When the computer program instructions are executed by the processors 202 and 213, the computer program instructions cause the processors 202 and 213 to perform the steps of the computer-implemented method for providing a complete traceability of changes incurred in a security policy corresponding to a resource 212 as disclosed in the detailed description of FIG. 1. In an embodiment, a single piece of a computer program code comprising computer program instructions performs one or more steps of the computer-implemented method disclosed in the detailed description of FIG. 1. The processors 202 and 213 of the administrator device 201 and the resource 212 respectively, retrieve these computer program instructions and execute them.

A module, or an engine, or a unit, as used herein, refers to any combination of hardware, software, and/or firmware. As an example, a module, or an engine, or a unit includes hardware, such as a microcontroller, associated with a non-transitory, computer-readable storage medium to store computer program codes adapted to be executed by the microcontroller to perform predetermined operations. Therefore, references to a module, or an engine, or a unit, in an embodiment, refer to the hardware that is specifically configured to recognize and/or execute the computer program codes to be held on a non-transitory, computer-readable storage medium. The computer program codes comprising computer readable and executable instructions can be implemented in any programming language, for example, C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

FIG. 3 exemplarily illustrates a schematic diagram showing maintenance of the policy database 210 by the policy tracing engine 207 for providing a complete traceability of changes incurred in a security policy corresponding to a resource 212, in accordance with an embodiment herein. The policy tracing engine 207 traces changes in security policies such that every policy action by a resource 212, for example, an endpoint device, is mapped to the source of the change, for example, either an administrator-initiated intent-based change or a dynamically induced event-based change to the security policy. In a microsegmentation security policy enforcement application, the policy tracing engine 207 performs microsegmentation security policy processing and computes and delivers an applicable microsegmentation security policy to the resource 212. In an embodiment, the policy tracing engine 207 is implemented in a zero-trust security application. As exemplarily illustrated in FIG. 3, the policy tracing engine 207 communicates with the policy agent 219 implemented at the resource 212. The policy tracing engine 207 also maintains the policy database 210. The policy tracing engine 207 monitors or listens for events associated with changes in resources that influence or create a need for recomputing the security policy corresponding to the resource 212 and determines events of interest that trigger recomputation of the security policy. The policy tracing engine 207 listens for administrator-initiated intent-based changes in the policy database 210. The policy tracing engine 207 also listens for dynamic events on the deployed resources or systems, for example, change of an internet protocol (IP) address, new role or attribute assignments, user login or logout, etc. These dynamic events may result in recomputation of the previously deployed security policy. Without recomputation, the previously deployed security policy may become stale and invalid. The policy tracing engine 207 determines intent-based changes and event-based changes incurred in the security policy.

The policy tracing engine 207 assigns a unique intent identifier to each of the intent-based changes and a unique event identifier to each of the event-based changes. The unique intent identifier is, for example, a configuration identifier, a configuration policy version number, or a commit identifier in case of a commit-based change handler. For all recomputed rows in the policy database 210 for a particular event, the policy tracing engine 207 stores the unique event identifier along with detailed information of the event in the policy database 210. The policy tracing engine 207 assigns a unique policy identifier to the security policy as a combination of the unique intent identifier and the unique event identifier. The policy tracing engine 207 stores the unique intent identifier, the unique event identifier, the configured security policy, the security policy computed and deployed at the resource 212, and detailed information of the event in the policy database 210. The policy tracing engine 207 transmits the security policy along with the unique policy identifier to the corresponding resource 212. The policy agent 219 at the resource 212 receives and applies the security policy. The policy agent 219 stores any policy action, for example, allowed or denied traffic, in the policy data store 220 of the resource 212 along with the unique policy identifier. The unique policy identifier, which is a combination of the unique intent identifier and the unique event identifier, is used to trace the policy actions to an exact source of the configured security policy and the exact event that recomputed the security policy.

Consider an example where an administrator configures a security policy "XXX" corresponding to a resource 212 in a microsegmentation security policy enforcement application. The policy tracing engine 207 stores the security policy "XXX" in the policy database 210 and transmits the security policy "XXX" to the resource 212. The policy agent 219 at the resource 212 receives the security policy "XXX" from the policy tracing engine 207 and deploys the security policy "XXX" at the resource 212. If the administrator modifies the security policy from "XXX" to "YYY", the policy tracing engine 207 determines an intent-based change made to the security policy "XXX" by the administrator. The policy tracing engine 207 assigns a unique intent identifier, for example, "100", to the intent-based change made to the security policy "XXX" and stores the assigned unique intent identifier in the policy database 210. Similarly, if a dynamic event, for example, a change in an IP address of the resource 212, is dynamically induced in the security policy "XXX", the policy tracing engine 207 determines an event-based change in the security policy "XXX" that converts the security policy "XXX" into the security policy "YYY". The policy tracing engine 207 assigns a unique event identifier, for example, "102", to the event-based change made to the security policy "XXX" and stores the assigned unique event identifier in the policy database 210. The policy tracing engine 207 also stores event information comprising, for example, a timestamp of an occurrence of the dynamic event and the event-based change, represented, for example, as "ZZZ" in the policy database 210. Storing the assigned unique event identifier and the event information in the policy database 210 provides a complete traceability from policy actions to the security policy. The security policy modified by the intent-based change and the event-based change is represented, for example, as security policy "YYY". The policy tracing engine 207 stores the modified security policy "YYY" in the policy database 210.

The policy tracing engine 207, therefore, stores the unique intent identifier, the unique event identifier, the configured security policy "XXX", the modified security policy "YYY", and the event information "ZZZ" in a table 210a of the policy database 210 as exemplarily illustrated in FIG. 3. The table 210a provides a mapping of the unique policy identifier to the configured security policy "XXX", the modified security policy "YYY", and the event information "ZZZ" and, therefore, creates a tracing link between the intent-based change and the event-based change to the security policy. By combining the assigned unique intent identifier "100" and the assigned unique event identifier "102", the policy tracing engine 207 configures and assigns a unique policy identifier, for example, as "100,102" to the modified security policy "YYY". The policy tracing engine 207 transmits the modified security policy "YYY" and the assigned unique policy identifier "100,102" to the resource 212. The policy agent 219 at the resource 212 receives the modified security policy "YYY" and the assigned unique policy identifier "100,102" and executes policy actions, for example, by allowing traffic or denying traffic as defined in the modified security policy "YYY". The policy agent 219 stores information of the policy actions along with the unique policy identifier "100,102" in the policy data store 220. When an enterprise wants to identify what caused traffic to be allowed or denied, the policy tracing engine 207 fetches the unique policy identifier of a particular policy action from the policy data store 220 and performs a lookup of the table 210a in the policy database 210 to obtain a trace of an exact source of the configured security policy "XXX", that is, the intent-based change, and an exact event that recomputed the security policy "XXX" to the modified security policy "YYY", thereby providing a complete traceability of the changes incurred in the security policy from "XXX" to "YYY" corresponding to the resource 212.

FIGS. 4A-4D exemplarily illustrate a sequence diagram showing interactions between the policy tracing engine 207, multiple databases 402, 210, 211, and 208, and resources 403, 404, 405, and 406 of an organization, for example, an enterprise, for providing a complete traceability of changes incurred in a security policy corresponding to a resource, for example, a managed host, Host-1 403, in accordance with an embodiment herein. Consider an example where an administrator 401 enters configuration parameters for configuring an intent-based security policy that provides access of a human resources (HR) web server 404 to an HR user, on the graphical user interface (GUI) 203a of the administrator device 201 shown in FIG. 2. In an embodiment, the data input by the administrator 401, for example, the configuration parameters via the GUI 203a of the administrator device 201, is transformed, processed, and executed by an algorithm in the policy tracing engine 207 for computation of the security policy. The policy tracing engine 207 receives the configuration parameters, for example, as policyIntent(from HR-user, to HR-WebServer, AccessParam(http, https)) and fetches corresponding assets from an asset database 402, where "http" and "https" refer to traffic protocols, hypertext transfer protocol and hypertext transfer protocol secure, respectively. The asset database 402 stores information of the enterprise's physical and information technology (IT) assets, for example, web servers, database servers, identity servers, etc. Using the configuration parameters and the fetched assets, the policy tracing engine 207 computes 407 the security policy for the HR web server 404 and assigns a unique intent identifier to the security policy. The policy tracing engine 207 stores the security policy with the assigned unique intent identifier in the policy database 210. The policy tracing engine 207 delivers the security policy and the assigned unique intent identifier to the HR web server 404.

Moreover, the administrator 401 enters configuration parameters for configuring another intent-based security policy that provides access of a database (DB) server 405 to the HR web server 404, on the GUI 203a of the administrator device 201. The policy tracing engine 207 receives the configuration parameters, for example, as policyIntent(from HR-WebServer, to DBServer, AccessParam(MSSQL)) and fetches corresponding assets from the asset database 402, where MSSQL refers to the Microsoft structured query language (SQL) parameter. Using the configuration parameters and the fetched assets, the policy tracing engine 207 computes 408 the security policy for the DB server 405 and assigns a unique intent identifier to the security policy. The policy tracing engine 207 stores the security policy with the assigned unique intent identifier in the policy database 210. The policy tracing engine 207 delivers the security policy and the assigned unique intent identifier to the HR web server 404 and the DB server 405.

When an end user, for example, an HR user, logs into Host-1 403 using a username, hr-user, and password, Host-1 403 communicates with an identity server 406 to authenticate the HR user and validate the HR user's login information stored in the identity server 406. The identity server 406 communicates with the policy tracing engine 207 and transmits the login information of the HR user to the policy tracing engine 207 as a dynamic event. The policy tracing engine 207 validates 409 whether the event is of interest. If the dynamic event is determined as an event of interest, the policy tracing engine 207 determines an event-based change to be incurred in the security policy and assigns a unique event identifier to the event-based change. The policy tracing engine 207 stores the unique event identifier with event information of the dynamic event in the event database 211. The policy tracing engine 207 determines which security policy and hosts require a change. In this example, the policy tracing engine 207 determines that an intent-based security policy associated with the HR user requires a recomputation. The policy tracing engine 207 recomputes the intent-based security policy to allow the HR user using Host-1 403 to access the HR web server 404. The policy tracing engine 207 stores the recomputed intent-based security policy with the assigned unique event identifier in the policy database 210. The policy tracing engine 207 delivers the recomputed security policy and the assigned unique event identifier to Host-1 403 and the HR web server 404. The HR user from Host-1 403 then connects 410 to the HR web server 404 and is allowed network access from Host-1 403 to the HR web server 404.

When the HR user accesses the HR web server 404, the HR web server 404 sends a network access record comprising network access information, for example, as NetworkAccessRecord(from IP, to self, http, intentId, eventId) to the policy tracing engine 207. The network access information comprises, for example, information of the IP address of Host-1 403, the traffic protocol used to access the HR web server 404, the unique intent identifier assigned to the security policy deployed on Host-1 403, and the unique event identifier assigned to the dynamic event of the HR user's login from Host-1 403. The unique intent identifier and the unique event identifier together form the unique policy identifier that creates a tracing link between the changes and the security policy. The data input into the policy tracing engine 207, for example, the network access information, is transformed, processed, and executed by an algorithm in the policy tracing engine 207 for generating a traceability report that traces each of multiple policy actions performed in a networked environment to a source of each of the changes incurred in the security policy as identified by the unique policy identifier.

The policy tracing engine 207 analyzes and correlates 411 the network access information in communication with the policy database 210 as follows. The policy tracing engine 207 determines which user logged in from Host-1 403; matches the IP address received in the network access record with the information of the assets fetched from the asset database 402; matches the unique intent identifier received in the network access record with the unique intent identifier stored in the policy database 210; and matches the unique event identifier received in the network access record with the unique event identifier stored in the policy database 210. The policy tracing engine 207 fetches the security policy configured by the administrator 401 using the unique intent identifier and the security policy recomputed based on the dynamic event using the unique event identifier from the policy database 210. For each network access record, the policy tracing engine 207 generates a traceability record comprising network access information and information on the source of the security policy, that is, the intent-based change and the event-based change. The policy tracing engine 207 maps policy attributes, for example, IP address, port, protocol, service, etc., contained in the security policy to network access attributes contained in the network access information and generates the traceability record that provides a full explanation, tracing back to changes performed by one or more administrators 401 and/or one or more events with a time sequence. The policy tracing engine 207 transmits the traceability record as a traceability report to enterprise personnel to provide them an explanation of which security policy was changed, when the security policy was changed, what caused the security policy to change, details of the change, changed hosts, etc. In this example, the traceability report shows that access was allowed by an administrator-initiated intent-based change identified by the unique intent identifier and by a dynamic event identified by the unique event identifier. The policy tracing engine 207 stores the traceability report in the traceability database 208.

In another example, when there is a dynamic event such as a change in the IP address of Host-1 403, a policy agent deployed at Host-1 403 transmits the new IP address to the policy tracing engine 207. The policy tracing engine 207 validates 412 whether the event is of interest. The policy tracing engine 207 determines the change in Host-1's 403 IP address is of interest as Host-1 403 has an active, managed security policy. Since Host-1 403 has an active, managed security policy, the policy tracing engine 207 determines that the security policy corresponding to Host-1 403 in relation to the HR web server 404 must be updated and proceeds to recompute the security policy for the HR web server 404. The policy tracing engine 207 assigns a unique event identifier to the dynamic event of the change in the IP address of Host-1 403 and stores the unique event identifier and the event information in the event database 211. The policy tracing engine 207 also stores the recomputed security policy with the changed IP address and the assigned unique event identifier in the policy database 210. The policy tracing engine 207 delivers the recomputed security policy with the changed IP address and the assigned unique event identifier to Host-1 403 and the HR web server 404. The HR user is then allowed access from Host-1 403 to the HR web server 404.

When the HR user access the HR web server 404, the HR web server 404 sends a network access record comprising network access information, for example, as NetworkAccessRecord(from IP1, to self, http, intentId, eventId) to the policy tracing engine 207. The network access information comprises, for example, information of the IP address of Host-1 403, the traffic protocol used to access the HR web server 404, the unique intent identifier assigned to the security policy deployed on Host-1 403, and the unique event identifier assigned to the dynamic event of the change in the IP address of Host-1 403. The unique intent identifier and the unique event identifier together form the unique policy identifier that creates a tracing link between the changes and the security policy. The policy tracing engine 207 analyzes and correlates the network access information in communication with the policy database 210 as follows. The policy tracing engine 207 matches the IP address received in the network access record with the information of the assets fetched from the asset database 402 to determine the host machine and the user who logged in from the IP address of Host-1 403; matches the unique intent identifier received in the network access record with the unique intent identifier stored in the policy database 210; and matches the unique event identifier received in the network access record with the unique event identifier stored in the policy database 210. For each network access record, the policy tracing engine 207 generates 413 a traceability record comprising access information and information on the source of the security policy, that is, the intent-based change and the event-based change. The traceability record further comprises details of the security policy obtained from the policy database 210 using the unique intent identifier and a sequence of events starting from the current unique event identifier. The policy tracing engine 207 transmits the traceability record as a traceability report to enterprise personnel to provide them an explanation of which security policy was changed, when the security policy was changed, what caused the security policy to change, details of the change, etc. In this example, the traceability report shows that access was allowed by an administrator-initiated intent-based change identified by the unique intent identifier and by a dynamic event identified by the unique event identifier. The policy tracing engine 207 stores the traceability report in the traceability database 208.

The computer-implemented method and the system disclosed herein implement one or more specific computer programs for providing a complete traceability of changes incurred in a security policy corresponding to a resource. The computer-implemented method and the system disclosed herein improve the functionality of a computer and provide an improvement in network security, microsegmentation and zero-trust security technology related to providing a complete traceability of changes incurred in a security policy corresponding to a resource as follows: On implementing the method disclosed herein, the policy tracing engine 207 shown in FIGS. 2-4D, monitors events, determines events of interest, and determines changes incurred in the security policy by the events of interest. Moreover, on determining the changes incurred in the security policy, the policy tracing engine 207 assigns a unique policy identifier to the security policy, where the unique policy identifier is configured as a combination of a unique intent identifier assigned to each of the intent-based changes and a unique event identifier assigned to each of the event-based changes. Furthermore, the policy tracing engine 207 recomputes and stores the security policy and the assigned unique policy identifier in the policy database 210 shown in FIGS. 2-4D, and transmits the security policy and the assigned unique policy identifier to the corresponding resource for deployment at the corresponding resource. Then, the policy tracing engine 207, through the use of separate and autonomous computer programs, receives network access information comprising the unique policy identifier from the corresponding resource deployed with the transmitted security policy and generates a traceability report that traces each of multiple policy actions performed in a networked environment to a source of each of the changes incurred in the security policy as identified by the unique policy identifier by analyzing and correlating the network access information in communication with the policy database 210.

The focus of the computer-implemented method and the system disclosed herein is on an improvement to network security, microsegmentation and zero-trust security technology related to providing a complete traceability of changes incurred in a security policy corresponding to a resource, and not on tasks for which a generic computer is used in its ordinary capacity. Rather, the computer-implemented method and the system disclosed herein are directed to a specific improvement to the way processors in the system operate, embodied in, for example, monitoring and determining events of interest occurring at a corresponding resource; determining changes incurred in the security policy by the events of interest; assigning a unique policy identifier to the security policy, where the unique policy identifier is configured as a combination of a unique intent identifier assigned to each of the intent-based changes and a unique event identifier assigned to each of the event-based changes; recomputing, storing and transmitting the security policy and the assigned unique policy identifier to the corresponding resource for deployment at the corresponding resource; receiving network access information comprising the unique policy identifier from the corresponding resource deployed with the transmitted security policy; and generating a traceability report that provides a complete traceability of each of multiple policy actions performed in a networked environment to a source of each of the changes incurred in the security policy as identified by the unique policy identifier.

In the computer-implemented method disclosed herein, the design and the flow of data and interactions between the policy tracing engine 207, the policy database 210, the event database 211, the policy management server 223, the policy agent 219 deployed on the resource 212, and the traceability database 208 shown in FIG. 2, are deliberate, designed, and directed. The interactions between the policy tracing engine 207, the policy database 210, the event database 211, the policy management server 223, the policy agent 219 deployed on the resource 212, and the traceability database 208 allow the system 200 shown in FIG. 2, to provide a complete traceability of changes incurred in a security policy corresponding to a resource. The steps performed by the policy tracing engine 207 disclosed above require eight or more separate computer programs and subprograms, the execution of which cannot be performed by a person using a generic computer with a generic program. The steps performed by the system 200 disclosed above are tangible, provide useful results, and are not abstract. The hardware and software implementation of the system 200 disclosed herein comprising the policy tracing engine 207, the policy database 210, the event database 211, the policy management server 223, the policy agent 219 deployed on the resource 212, the traceability database 208, and one or more processors 202 and 213 shown in FIG. 2, is an improvement in network security, microsegmentation and zero-trust security technology.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor or a similar device. In different embodiments, the "non-transitory, computer-readable storage media" also refer to a single medium or multiple media, for example, a centralized database, a distributed database, and/or associated caches and servers that store one or more sets of instructions that are read by a computer, a processor or a similar device. The "non-transitory, computer-readable storage media" also refer to any medium capable of storing or encoding a set of instructions for execution by a computer, a processor or a similar device and that causes a computer, a processor or a similar device to perform any one or more of the steps of the method disclosed herein. In an embodiment, the computer programs that implement the methods and algorithms disclosed herein are stored and transmitted using a variety of media, for example, the computer-readable media in various manners. In an embodiment, hard-wired circuitry or custom hardware is used in place of, or in combination with, software instructions for implementing the processes of various embodiments. Therefore, the embodiments are not limited to any specific combination of hardware and software. In another embodiment, various aspects of the computer-implemented method and the system disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the computer-implemented method and the system disclosed herein are implemented as programmed elements, or non-programmed elements, or any suitable combination thereof.

Where databases are described such as the policy database 210, the event database 211, the graph database 224, the traceability database 208, and the policy data store 220 shown in FIG. 2, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases in the system, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more embodiments disclosed herein are distributed among one or more computer systems, for example, servers configured to provide one or more services to one or more client computers, or to perform a complete task in a distributed system. For example, one or more embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

What is claimed is:

1. A computer-implemented method for providing a complete traceability of changes incurred in a security policy corresponding to a resource, the computer-implemented method comprising:
monitoring events occurring at the corresponding resource by a policy tracing engine;
determining events of interest from the monitored events by the policy tracing engine, wherein the events of interest comprise events that trigger recomputation of the security policy configured for the corresponding resource and deployed at the corresponding resource;
determining, by the policy tracing engine, the changes incurred in the security policy caused by the events of interest, wherein the changes comprise (i) intent-based changes initiated by an administrator and (ii) event-based changes dynamically induced at the corresponding resource;
on determining the changes incurred in the security policy, assigning a unique policy identifier to the security policy by the policy tracing engine, wherein the unique policy identifier is configured as a mapping of a combination of (i) a unique intent identifier assigned to each of the intent-based changes and (ii) a unique event identifier assigned to each of the event-based changes, and wherein the unique policy identifier creates a tracing link between the changes and the security policy;
recomputing the security policy based on the changes and storing the security policy and the assigned unique policy identifier in a policy database by the policy tracing engine;
transmitting the security policy and the assigned unique policy identifier to the corresponding resource by the policy tracing engine for deployment at the corresponding resource;
receiving, by the policy tracing engine, network access information comprising the unique policy identifier from the corresponding resource deployed with the transmitted security policy; and
generating, by the policy tracing engine, a traceability report that provides a complete traceability of each of a plurality of policy actions, including at least network traffic to be allowed or denied on the corresponding resource, performed in a networked environment to a source of each of the changes incurred in the security policy as identified by the unique policy identifier by analyzing and correlating the network access information in communication with the policy database so as to enable the created tracing link to identify a cause of a particular policy action by retrieving the unique policy identifier of the particular policy action and performing a table lookup in the policy database to obtain a trace of an exact source of the configured security policy of the intent-based change, and an exact event that recomputed the configured security policy to the modified security policy, thereby providing a complete traceability of the changes incurred in the security policy from "configured" to "modified" corresponding to the corresponding resource.

2. The computer-implemented method according to claim 1, further comprising: storing a mapping of the unique intent identifier and information of the each of the intent-based changes in the policy database by the policy tracing engine, wherein the information of the each of the intent-based changes comprises a timestamp of an occurrence of the each of the intent-based changes.

3. The computer-implemented method according to claim 1, further comprising: storing a mapping of the unique event identifier and information of the each of the event-based changes in one of an event database, the policy database, and a combination thereof, by the policy tracing engine, wherein the information of the each of the event-based changes comprises a timestamp of an occurrence of an event and the each of the event-based changes.

4. The computer-implemented method according to claim 1, wherein the analysis and the correlation of the network access information comprising the unique policy identifier, in communication with the policy database, comprise:
fetching, by the policy tracing engine, detailed information of an intent-based change corresponding to the unique intent identifier configured in the unique policy identifier, from the policy database;
fetching, by the policy tracing engine, detailed information of an event-based change corresponding to the unique event identifier configured in the unique policy identifier, from the policy database; and
mapping, by the policy tracing engine, policy attributes of the security policy stored in the policy database to network access attributes contained in the network access information using the detailed information of the intent-based change and the detailed information of the event-based change for tracing the each of the policy actions performed in the networked environment to the source of one or more of the intent-based change and the event-based change.

5. The computer-implemented method according to claim 1, further comprising: dynamically updating, by the policy tracing engine, the policy database with the each of the intent-based changes and the assigned unique intent identifier, the each of the event-based changes and the assigned unique event identifier, the security policy configured by the administrator, and the security policy deployed at the corresponding resource.

6. The computer-implemented method according to claim 1, wherein the policy tracing engine generates the traceability report for selected time intervals to provide a time-based trace of the each of the policy actions performed in the networked environment to the source of the each of the changes incurred in the security policy as identified by the unique policy identifier.

7. A system for providing a complete traceability of changes incurred in a security policy corresponding to a resource, the system comprising:
at least one processor device; and
a non-transitory, computer-readable storage medium operably and communicatively coupled to the at least one processor device and configured to store computer program instructions defined by a policy tracing engine, the computer program instructions which, when executed by the at least one processor device, cause the at least one processor device to:
monitor events occurring at the corresponding resource;
determine events of interest from the monitored events, wherein the events of interest comprise events that trigger recomputation of the security policy configured for the corresponding resource and deployed at the corresponding resource;
determine the changes incurred in the security policy caused by the events of interest, wherein the changes comprise (i) intent-based changes initiated by an administrator and (ii) event-based changes dynamically induced at the corresponding resource;

on determining the changes incurred in the security policy, assign a unique policy identifier to the security policy, wherein the unique policy identifier is configured as a mapping of a combination of (i) a unique intent identifier assigned to each of the intent-based changes and (ii) a unique event identifier assigned to each of the event-based changes, and wherein the unique policy identifier creates a tracing link between the changes and the security policy;

recompute the security policy based on the changes and store the security policy and the assigned unique policy identifier in a policy database;

transmit the security policy and the assigned unique policy identifier to the corresponding resource for deployment at the corresponding resource;

receive network access information comprising the unique policy identifier from the corresponding resource deployed with the transmitted security policy, and generate a traceability report that provides a complete traceability of each of a plurality of policy actions, including at least network traffic to be allowed or denied on the corresponding resource, performed in a networked environment to a source of each of the changes incurred in the security policy as identified by the unique policy identifier by analyzing and correlating the network access information in communication with the policy database so as to enable the created tracing link to identify a cause of a particular policy action by retrieving the unique policy identifier of the particular policy action and performing a table lookup in the policy database to obtain a trace of an exact source of the configured security policy of the intent-based change, and an exact event that recomputed the configured security policy to the modified security policy, thereby providing a complete traceability of the changes incurred in the security policy from "configured" to "modified" corresponding to the corresponding resource.

8. The system according to claim 7, wherein the policy tracing engine defines additional computer program instructions which, when executed by the at least one processor, cause the at least one processor to store a mapping of the unique intent identifier and information of the each of the intent-based changes in the policy database, wherein the information of the each of the intent-based changes comprises a timestamp of an occurrence of the each of the intent-based changes.

9. The system according to claim 7, wherein the policy tracing engine defines additional computer program instructions which, when executed by the at least one processor, cause the at least one processor to store a mapping of the unique event identifier and information of the each of the event-based changes in one of an event database, the policy database, and a combination thereof, wherein the information of the each of the event-based changes comprises a timestamp of an occurrence of an event and the each of the event-based changes.

10. The system according to claim 7, wherein the policy tracing engine defines additional computer program instructions which, when executed by the at least one processor, cause the at least one processor to:

fetch detailed information of an intent-based change corresponding to the unique intent identifier configured in the unique policy identifier, from the policy database;

fetch detailed information of an event-based change corresponding to the unique event identifier configured in the unique policy identifier, from the policy database; and map policy attributes of the security policy stored in the policy database to network access attributes contained in the network access information using the detailed information of the intent-based change and the detailed information of the event-based change for tracing the each of the policy actions performed in the networked environment to the source of one or more of the intent-based change and the event-based change.

11. The system according to claim 7, wherein the policy tracing engine defines additional computer program instructions which, when executed by the at least one processor, cause the at least one processor to dynamically update the policy database with the each of the intent-based changes and the assigned unique intent identifier, the each of the event-based changes and the assigned unique event identifier, the security policy configured by the administrator, and the security policy deployed at the corresponding resource.

12. The system according to claim 7, wherein the policy tracing engine defines additional computer program instructions which, when executed by the at least one processor, cause the at least one processor to generate the traceability report for selected time intervals to provide a time-based trace of the each of the policy actions performed in the networked environment to the source of the each of the changes incurred in the security policy as identified by the unique policy identifier.

13. A non-transitory, computer-readable storage medium having embodied thereon, computer program instructions executable by at least one processor device for providing a complete traceability of changes incurred in a security policy corresponding to a resource, the computer program instructions which, when executed by the at least one processor device, cause the at least one processor device to:

monitor events occurring at the corresponding resource;

determine events of interest from the monitored exents, wherein the events of interest comprise events that trigger recomputation of the security policy configured for the corresponding resource and deployed at the corresponding resource;

determine the changes incurred in the security policy caused by the events of interest, wherein the changes comprise (i) intent-based changes initiated by an administrator and (ii) event-based changes dynamically induced at the corresponding resource;

on determining the changes incurred in the security policy, assign a unique policy identifier to the security policy, wherein the unique policy identifier is configured as a mapping of a combination of (i) a unique intent identifier assigned to each of the intent-based changes and (ii) a unique exent identifier assigned to each of the event-based changes, and wherein the unique policy identifier creates a tracing link between the changes and the security policy;

recompute the security policy based on the changes and store the security policy and the assigned unique policy identifier in a policy database;

transmit the security policy and the assigned unique policy identifier to the corresponding resource for deployment at the corresponding resource;

receive network access information comprising the unique policy identifier from the corresponding resource deployed with the transmitted security policy; and generate a traceability report that provides a complete traceability of each of a plurality of policy actions, including at least network traffic to be allowed or denied on the corresponding resource, performed in a networked en ironment to a source of each of the changes incurred in the security policy as identified by the unique policy identifier by analyzing and correlating the network access information in communication with the policy database so as to enable the created tracking link to identify a cause of a particular policy action by retrieving the unique policy identifier of the particular policy action and performing a table lookup in the policy database to obtain a trace of an exact source of the configured security policy of the intent-based change, and an exact event that recomputed the configured security policy to the modified security policy, thereby providing a complete traceability of the changes incurred in the security policy from "configured" to "modified" corresponding to the corresponding resource.

14. The non-transitory, computer-readable storage medium according to claim 13, wherein the computer program instructions when executed by the at least one processor further cause the at least one processor to store a mapping of the unique intent identifier and information of the each of the intent-based changes in the policy database, wherein the information of the each of the intent-based changes comprises a timestamp of an occurrence of the each of the intent-based changes.

15. The non-transitory, computer-readable storage medium according to claim 13, wherein the computer program instructions when executed by the at least one processor further cause the at least one processor to store a mapping of the unique event identifier and information of the each of the event-based changes in one of an event database, the policy database, and a combination thereof, wherein the information of the each of the event-based changes comprises a timestamp of an occurrence of an event and the each of the event-based changes.

16. The non-transitory, computer-readable storage medium according to claim 13, wherein, in the analysis and the correlation of the network access information comprising the unique policy identifier, in communication with the policy database, the computer program instructions when executed by the at least one processor further cause the at least one processor to:

fetch detailed information of an intent-based change corresponding to the unique intent identifier configured in the unique policy identifier, from the policy database;

fetch detailed information of an event-based change corresponding to the unique event identifier configured in the unique policy identifier, from the policy database; and map policy attributes of the security policy stored in the policy database to network access attributes contained in the network access information using the detailed information of the intent-based change and the detailed information of the event-based change for tracing the each of the policy actions performed in the networked environment to the source of one or more of the intent-based change and the event-based change.

17. The non-transitory, computer-readable storage medium according to claim 13, wherein the computer program instructions when executed by the at least one processor further cause the at least one processor to dynamically update the policy database with the each of the intent-based changes and the assigned unique intent identifier, the each of the event-based changes and the assigned unique event identifier, the security policy configured by the administrator, and the security policy deployed at the corresponding resource.

18. The non-transitory, computer-readable storage medium according to claim 13, wherein the computer program instructions when executed by the at least one processor further cause the at least one processor to generate the traceability report for selected time intervals to provide a time-based trace of the each of the policy actions performed in the networked environment to the source of the each of the changes incurred in the security policy as identified by the unique policy identifier.

* * * * *